US012500445B2

(12) United States Patent
Bodurka

(10) Patent No.: US 12,500,445 B2
(45) Date of Patent: Dec. 16, 2025

(54) DOOR ASSEMBLY HAVING RECHARGEABLE BATTERY, METHODS AND SYSTEM FOR CHARGING THE BATTERY

(71) Applicant: Masonite Corporation, Tampa, FL (US)

(72) Inventor: Alex Bodurka, Portage, MI (US)

(73) Assignee: Masonite Corporation, Tampa, FL (US)

( * ) Notice: Subject to any disclaimer, the term of this patent is extended or adjusted under 35 U.S.C. 154(b) by 102 days.

(21) Appl. No.: 17/951,737

(22) Filed: Sep. 23, 2022

(65) Prior Publication Data

US 2023/0087532 A1 Mar. 23, 2023

Related U.S. Application Data

(60) Provisional application No. 63/247,494, filed on Sep. 23, 2021.

(51) Int. Cl.

| | |
|---|---|
| ***H02J 50/00*** | (2016.01) |
| ***E05F 15/60*** | (2015.01) |
| ***H02J 7/00*** | (2006.01) |
| ***H02J 7/35*** | (2006.01) |
| *E05B 47/00* | (2006.01) |

(52) U.S. Cl.

CPC ............ *H02J 50/001* (2020.01); *E05F 15/60* (2015.01); *H02J 7/0013* (2013.01); *H02J 7/0042* (2013.01);

(Continued)

(58) Field of Classification Search

CPC ...... H02J 50/001; H02J 7/0013; H02J 7/0042; H02J 7/0063; H02J 7/35; H02J 7/32;

(Continued)

(56) References Cited

U.S. PATENT DOCUMENTS

| | | | |
|---|---|---|---|
| 6,100,663 | A | 8/2000 | Boys et al. |
| 6,409,517 | B2 | 6/2002 | Malnati |

(Continued)

FOREIGN PATENT DOCUMENTS

| | | | |
|---|---|---|---|
| AU | 2020101466 | A4 | 8/2020 |
| CN | 200968110 | Y | 10/2007 |

(Continued)

OTHER PUBLICATIONS

Machine translation of DE-19628289-A1.*
PCT International Search Report and Written Opinion for PCT/US2021/012280, mailed Jan. 17, 2023, 8 pp.

*Primary Examiner* — Marcus Menezes
(74) *Attorney, Agent, or Firm* — IceMiller LLP

(57) ABSTRACT

The present invention relates to exterior or interior doors for residential or commercial buildings, such as for a home, apartment, condominium, hotel room or business, and, more particularly, to a door provided with a rechargeable battery as a source of electrical power that may be used to operate electric devices mounted to the door. The door has electric devices attached thereto. The electric devices which. are powered by one or more rechargeable batteries that are charged by one or more energy harvester systems and/or by direct connection to a power source. A system for distributing the power collected from the energy harvester system and/or the wired connection are also provided.

34 Claims, 21 Drawing Sheets

(52) U.S. Cl.
CPC .............. *H02J 7/0063* (2013.01); *H02J 7/35* (2013.01); *E05B 47/0001* (2013.01); *E05B 2047/0058* (2013.01); *E05Y 2201/434* (2013.01); *E05Y 2400/614* (2013.01); *E05Y 2900/132* (2013.01)

(58) Field of Classification Search
CPC .................. E05F 15/60; E05B 47/0001; E05B 2047/0057; E05B 2047/0064; E05Y 2201/434; E05Y 2400/614; E05Y 2900/132; E05Y 2400/612
USPC ...................................................... 49/70, 501
See application file for complete search history.

(56) References Cited

U.S. PATENT DOCUMENTS

| | | | |
|---|---|---|---|
| 7,173,343 B2 | 2/2007 | Kugel | |
| 7,649,305 B2 | 1/2010 | Priya et al. | |
| 7,824,200 B2 | 11/2010 | Bryla et al. | |
| 8,156,671 B2 | 4/2012 | Presley et al. | |
| 8,169,169 B2 | 5/2012 | Hass et al. | |
| 8,337,039 B1 | 12/2012 | Larkin | |
| 8,354,914 B2 | 1/2013 | Buckingham et al. | |
| 8,772,970 B2 | 7/2014 | Lambrou | |
| 8,844,200 B2 * | 9/2014 | Yulkowski | E05F 15/603 49/31 |
| 9,133,647 B2 | 9/2015 | Oh et al. | |
| 9,151,079 B2 | 10/2015 | Webb et al. | |
| 9,290,966 B2 | 3/2016 | Hanchett, Jr. | |
| 9,293,943 B2 | 3/2016 | Kim et al. | |
| 9,378,597 B2 | 6/2016 | Shen et al. | |
| 9,466,419 B2 | 10/2016 | Boys et al. | |
| 9,652,917 B2 | 5/2017 | Johnson et al. | |
| 9,704,320 B2 | 7/2017 | Johnson et al. | |
| 9,876,386 B2 | 1/2018 | Geiszler | |
| 9,876,387 B2 | 1/2018 | Geiszler | |
| 9,922,513 B1 | 3/2018 | Hall et al. | |
| 10,037,636 B2 | 7/2018 | Ho et al. | |
| 10,043,332 B2 | 8/2018 | Scalisi et al. | |
| 10,121,300 B2 | 11/2018 | Wang | |
| 10,128,283 B2 | 11/2018 | Bryla | |
| 10,135,288 B2 | 11/2018 | Geiszler | |
| 10,347,064 B2 | 7/2019 | Kim et al. | |
| 10,361,880 B1 | 7/2019 | Marcinkowski et al. | |
| 10,453,280 B2 | 10/2019 | Kontturi | |
| 10,664,688 B2 | 5/2020 | Goulden et al. | |
| 10,691,953 B2 | 6/2020 | Johnson et al. | |
| 10,727,682 B2 | 7/2020 | Park et al. | |
| 10,733,823 B2 | 8/2020 | Scalisi | |
| 10,755,509 B2 | 8/2020 | Saeedi et al. | |
| 10,797,500 B2 | 10/2020 | Huang et al. | |
| 10,803,685 B2 | 10/2020 | Marcinkowski et al. | |
| 10,818,118 B2 | 10/2020 | Sivalingam et al. | |
| 10,938,250 B2 * | 3/2021 | Ahmed | G07C 9/30 |
| 10,950,076 B1 | 3/2021 | Hall et al. | |
| 10,957,169 B2 | 3/2021 | Rosenberg et al. | |
| 10,964,138 B2 | 3/2021 | Geerlings et al. | |
| 10,997,547 B2 | 5/2021 | Hall et al. | |
| 10,999,092 B2 | 5/2021 | Marcinkowski et al. | |
| 11,005,285 B2 | 5/2021 | Partovi | |
| 11,174,666 B2 | 11/2021 | Demele et al. | |
| 11,187,022 B1 * | 11/2021 | Hoffberg | E05F 3/222 |
| 11,244,523 B1 | 2/2022 | Brady et al. | |
| 11,248,410 B2 | 2/2022 | Dreyer et al. | |
| 11,290,298 B2 | 3/2022 | Marcinkowski et al. | |
| 11,339,604 B2 | 5/2022 | Dreyer | |
| 11,346,141 B2 | 5/2022 | Gregoriou | |
| 11,346,150 B1 | 5/2022 | Johnston | |
| 11,352,812 B2 | 6/2022 | Johnson | |
| 11,373,471 B2 * | 6/2022 | Anderson | E06B 7/28 |
| D957,688 S | 7/2022 | Kim et al. | |
| 11,388,373 B2 | 7/2022 | Scalisi | |
| 11,403,899 B2 | 8/2022 | Zhang | |
| 11,403,902 B2 | 8/2022 | Ho et al. | |
| 11,417,200 B2 | 8/2022 | Hass et al. | |
| 11,441,332 B2 | 9/2022 | Johnson et al. | |
| 11,532,192 B2 | 12/2022 | Hass et al. | |
| 11,536,078 B2 | 12/2022 | Dreyer | |
| 11,539,794 B1 | 12/2022 | Weber et al. | |
| 11,543,801 B2 | 1/2023 | Hall et al. | |
| 11,655,669 B2 | 5/2023 | Hutton et al. | |
| 11,694,287 B2 | 7/2023 | Marcinkowski et al. | |
| 11,729,014 B2 | 8/2023 | Marcinkowski et al. | |
| 11,767,710 B1 | 9/2023 | Johnston | |
| 12,139,960 B2 * | 11/2024 | Wang | E06B 3/4618 |
| 2003/0063715 A1 * | 4/2003 | Peplinski | H02J 7/0048 379/67.1 |
| 2009/0273322 A1 | 11/2009 | Riley et al. | |
| 2013/0260676 A1 * | 10/2013 | Singh | H04B 5/45 307/104 |
| 2014/0020295 A1 | 1/2014 | Bonahoom et al. | |
| 2014/0020312 A1 | 1/2014 | Seiling et al. | |
| 2014/0267739 A1 | 9/2014 | Ibsies | |
| 2014/0340032 A1 * | 11/2014 | Curtis | H02J 50/12 320/108 |
| 2016/0163139 A1 | 6/2016 | Kankkunen et al. | |
| 2016/0322847 A1 | 11/2016 | Geiszler | |
| 2017/0040827 A1 * | 2/2017 | Weber | E05B 47/00 |
| 2017/0149265 A1 | 5/2017 | Huang | |
| 2017/0358952 A1 | 12/2017 | Butler et al. | |
| 2018/0114389 A1 | 4/2018 | Geiszler | |
| 2019/0063128 A1 * | 2/2019 | McLeod | E05B 47/0002 |
| 2019/0271186 A1 | 9/2019 | Chen et al. | |
| 2019/0333302 A1 | 10/2019 | Kagnew et al. | |
| 2020/0014552 A1 | 1/2020 | Tan et al. | |
| 2020/0082240 A1 | 3/2020 | Heitmar | |
| 2020/0349786 A1 | 11/2020 | Ho et al. | |
| 2020/0378172 A1 | 12/2020 | Lerpard | |
| 2021/0207419 A1 | 7/2021 | Sorice et al. | |
| 2021/0207420 A1 | 7/2021 | Sorice et al. | |
| 2021/0207421 A1 | 7/2021 | Sorice et al. | |
| 2021/0209878 A1 | 7/2021 | Kim et al. | |
| 2022/0155005 A1 | 5/2022 | Lee et al. | |
| 2022/0186543 A1 | 6/2022 | Soderqvist | |
| 2022/0263297 A1 | 8/2022 | Bodurka et al. | |
| 2022/0351722 A1 | 11/2022 | Mandry et al. | |
| 2022/0392287 A1 | 12/2022 | Shen | |
| 2023/0062621 A1 | 3/2023 | Cheung | |
| 2023/0087532 A1 * | 3/2023 | Bodurka | H02J 7/35 49/70 |
| 2023/0184022 A1 | 6/2023 | Eliasson et al. | |
| 2024/0262248 A1 * | 8/2024 | Armstrong | H02J 7/00712 |

FOREIGN PATENT DOCUMENTS

| | | | |
|---|---|---|---|
| CN | 103606213 A | 2/2014 | |
| CN | 104105248 A | 10/2014 | |
| CN | 203925102 U | 11/2014 | |
| CN | 205117039 U | 3/2016 | |
| CN | 106761274 A | 5/2017 | |
| CN | 106836990 A | 6/2017 | |
| CN | 206309153 U | 7/2017 | |
| CN | 206329255 U | 7/2017 | |
| CN | 10704424 A | 8/2017 | |
| CN | 107191110 A | 9/2017 | |
| CN | 107448128 A | 12/2017 | |
| CN | 107575137 A | 1/2018 | |
| CN | 107610390 A | 1/2018 | |
| CN | 107643706 A | 1/2018 | |
| CN | 206903524 U | 1/2018 | |
| CN | 107705511 A | 2/2018 | |
| CN | 107730687 A | 2/2018 | |
| CN | 107747457 A | 3/2018 | |
| CN | 107795255 A | 3/2018 | |
| CN | 107829659 A | 3/2018 | |
| CN | 108118987 A | 6/2018 | |
| CN | 207458156 U | 6/2018 | |
| CN | 108389290 A | 8/2018 | |
| CN | 108399674 A | 8/2018 | |
| CN | 108412359 A | 8/2018 | |
| CN | 108442852 A | 8/2018 | |
| CN | 108616169 A * | 10/2018 | H02J 50/12 |

(56) References Cited

FOREIGN PATENT DOCUMENTS

CN 108661486 A 10/2018
CN 108756617 A 11/2018
CN 108868508 A 11/2018
CN 108915498 A 11/2018
CN 108924015 A 11/2018
CN 108952449 A 12/2018
CN 109098543 A 12/2018
CN 109138774 A 1/2019
CN 109191617 A 1/2019
CN 109191739 A 1/2019
CN 109236134 A 1/2019
CN 109236135 A 1/2019
CN 109267837 A 1/2019
CN 109472902 A 3/2019
CN 208777869 U 4/2019
CN 110009782 A 7/2019
CN 209267230 U * 8/2019
CN 110264682 A 9/2019
CN 209429913 U 9/2019
CN 110409954 A 11/2019
CN 110505182 A 11/2019
CN 110531631 A 12/2019
CN 209990389 U 1/2020
CN 110778265 A 2/2020
CN 111173404 A 5/2020
CN 111270959 A 6/2020
CN 111343432 A 6/2020
CN 111441680 A 7/2020
CN 211038390 U 7/2020
CN 211124167 U 7/2020
CN 111505947 A 8/2020
CN 111540093 A 8/2020
CN 111653025 A 9/2020
CN 111764747 A 10/2020
CN 211851423 U 11/2020
CN 112096221 A 12/2020
CN 112211496 A 1/2021
CN 112267796 A 1/2021
CN 112330869 A 2/2021
CN 112491668 A 3/2021
CN 112539020 A 3/2021
CN 213205374 U 5/2021
CN 112901047 A 6/2021
CN 113048374 A 6/2021
CN 113129476 A 7/2021
CN 113338772 A 9/2021
CN 113345130 A 9/2021
CN 113545639 A 10/2021
CN 113645446 A 11/2021
CN 113674454 A 11/2021
CN 113706744 A 11/2021
CN 214835862 U 11/2021
CN 214886488 U 11/2021
CN 214943492 U 11/2021
CN 215169563 U 12/2021
CN 113947834 A 1/2022
CN 216487755 U * 5/2022
CN 217240775 U 8/2022
CN 217307315 U 8/2022
CN 115095246 A 9/2022
CN 115164381 A 10/2022
CN 115235096 A 10/2022
CN 115294675 A 11/2022
CN 115324428 A 11/2022
CN 115341821 A 11/2022
CN 115393988 A 11/2022
CN 218454661 U 2/2023
CN 115798084 A 3/2023
CN 116251221 A 6/2023
CN 219197192 U 6/2023
CN 219246122 U 6/2023
CN 116498183 A 7/2023
CN 219374133 U * 7/2023
CN 116760602 A 9/2023
CN 117238059 A 12/2023
DE 19628289 A1 * 2/1997 ............ E05F 15/603
DE 202022101334 U1 5/2022
EP 3118405 A1 1/2017
EP 3537398 A1 9/2019
EP 3845729 A1 7/2021
FR 3132160 A3 7/2023
IN 201921017138 A 5/2019
IN 201911049967 A 12/2019
IN 201911048995 A 5/2021
IN 202111053824 A 12/2021
IN 202241020116 A 4/2022
IN 202241026843 A 5/2022
IN 411059 B 11/2022
IN 202111013824 A 12/2022
IN 430120 B 4/2023
IN 202341019331 A 4/2023
JP 2004116071 A * 4/2004
JP 6680821 B2 3/2020
JP 2020042440 A 3/2020
JP 6777955 B2 10/2020
KR 20160025226 A 3/2016
KR 20160050965 A 5/2016
KR 20160123639 A 10/2016
KR 20160124481 A 10/2016
KR 101800514 B1 12/2017
KR 20180076537 A 7/2018
KR 20180131716 A 12/2018
KR 101988851 B1 6/2019
KR 20190098719 A 8/2019
KR 20190098720 A 8/2019
KR 102024754 B1 9/2019
KR 102079532 B1 2/2020
KR 102150642 B1 9/2020
KR 20200143302 A 12/2020
KR 20210004253 A 1/2021
KR 20210016726 A 2/2021
KR 20210019211 A 2/2021
KR 20210019216 A 2/2021
KR 20210019218 A 2/2021
KR 20210019241 A 2/2021
KR 20210045195 A 4/2021
KR 20210072510 A 6/2021
KR 20210078199 A 6/2021
KR 102303254 B1 9/2021
KR 102329035 B1 11/2021
KR 102341883 B1 12/2021
KR 20210153308 A 12/2021
KR 20220031428 A 3/2022
KR 102421708 B1 7/2022
KR 20220113136 A 8/2022
KR 20220119878 A 8/2022
KR 102472384 B1 12/2022
KR 102534826 B1 5/2023
TW M627626 U 6/2022
WO 2013163124 A1 10/2013
WO 2016032464 A1 3/2016
WO 2016175910 A1 11/2016
WO 2017024088 A1 2/2017
WO 2017165424 A 9/2017
WO 2018184450 A1 10/2018
WO 2018184452 A1 10/2018
WO 2018184453 A1 10/2018
WO 2018184454 A1 10/2018
WO 2019068021 A1 4/2019
WO 2019162435 A1 8/2019
WO 2022004989 A1 1/2022
WO 2022010071 A1 1/2022
WO 2022010072 A1 1/2022
WO 2022010073 A1 1/2022
WO 2022010074 A1 1/2022
WO 2022020893 A1 2/2022
WO 2022145966 A1 7/2022
WO 2022263147 A1 12/2022
WO 2023180427 A1 9/2023

* cited by examiner

DOOR ASSEMBLY HAVING RECHARGEABLE BATTERY, METHODS AND SYSTEM FOR CHARGING THE BATTERY

REFERENCE TO RELATED APPLICATION

The present invention claims the priority of U.S. Provisional Patent Application No. 63/247,494, filed Sep. 23, 2021, which is incorporated herein.

FIELD OF THE INVENTION

The present invention is directed to exterior or interior doors for residential or commercial buildings, such as for a home, apartment, condominium, hotel room or business, and, more particularly, to a door provided with a rechargeable battery as a source of electrical power that may be used to operate electric devices mounted to the door. The invention is also directed to a battery charging systems and methods for automatically charging the rechargeable battery in the door.

BACKGROUND OF THE INVENTION

Typical existing exterior or interior doors for residential or commercial buildings may have a number of electric devices (or components) mounted to the doors in order to provide desired functions, such as electronic access control, door state feedback, an entry camera and audio communication, an electric powered door latch, an electric powered door lock, etc. Also, the market for exterior and interior doors has seen an increasing adoption of additional electric devices, including video doorbells, smart locks, LED lighting, smart glass, electromechanical door closers, wireless connectivity electronics, etc. Some of these electric devices are an add-on to an existing door, functions with the existing door construction, and is powered separately with at least one battery that needs periodic replacement or recharging. Should the battery not be replaced or recharged, then the electric device will not operate.

Current electric devices are mounted to exterior or interior doors in a manner that can be unattractive and unpleasant to look at. They typically each have either one or more rechargeable battery packs or at least one non-rechargeable battery that must periodically be replaced or changed and have some type of weatherable housing.

While the commercial market, e.g. multi-tenant and mixed-use housing, hospitality, office, etc., has developed electrified door entry systems with electric strikes and door controller technologies, adoption of such devices into the residential market has been limited. Existing residential door construction techniques focus on stile and rail construction, and have not seen integration of power systems, power management systems or integration of electric devices. Moreover, installing a full door system with integrated power supply is costly and difficult to coordinate electricians and general contractors.

It has been proposed to provide power to a door by supplying grid power through an electric hinge, power converter, or like electric system that connects the door to the grid. Such a system can require difficult coordination, particularly if the door is being installed after construction, such as during remodeling. In aftermarket installation, the activities of the electrician must be coordinated with the general contractor, and may require that adjacent walls be opened in order to allow the system to connect to the grid.

These coordination and installation difficulties may increase cost and make installation more difficult than necessary.

Therefore, a need exists for a door designed for integration of electric devices into the door, with a battery charging system for automatically charging a rechargeable battery disposed in the door. Thus, improvements that may enhance performance and cost of door assemblies with electric devices are possible, while also increasing the ease of installation.

SUMMARY OF THE INVENTION

An aspect of the present invention provides a door having electric devices attached thereto. The electric devices are powered by one or more rechargeable batteries, that are charged by one or more energy harvester systems and/or by direct connection to a power source. A system for distributing the power collected from the energy harvester system and/or the wired connection are also provided.

Another aspect of the present invention provides a door assembly having a door frame mounted in an opening and the door hinge mounted on the door frame.

Methods for making and using the different aspects of the present invention are also provided.

Other aspects of the invention, including apparatus, devices, kits, processes, and the like which constitute part of the invention, will become more apparent upon reading the following detailed description of the exemplary embodiments

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION OF EXEMPLARY EMBODIMENT(S)

Figure 1:
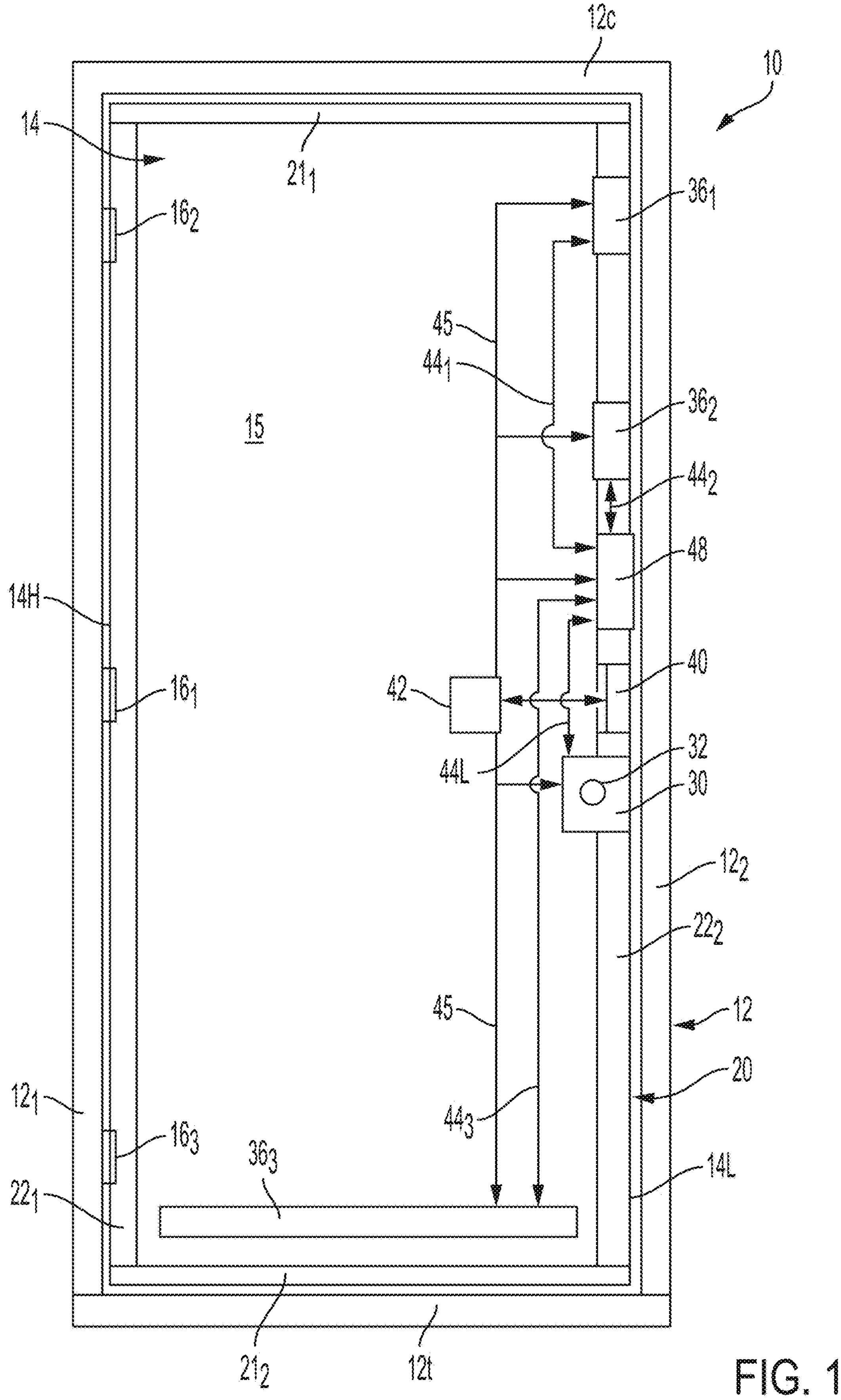
FIG. 1 shows an exterior door assembly according to an exemplary embodiment of a door system with electronics with portions exposed.

Reference will now be made in detail to the exemplary embodiments and exemplary methods as illustrated in the accompanying drawings, in which like reference characters designate like or corresponding parts throughout the drawings. It should be noted, however, that the invention in its broader aspects is not necessarily limited to the specific details, representative materials and methods, and illustrative examples shown and described in connection with the exemplary embodiments and exemplary methods.

This description of exemplary embodiments is intended to be read in connection with the accompanying drawings, which are to be considered part of the entire written description. In the description, relative terms such as "horizontal," "vertical," "front," "rear," "upper", "lower", "top" and "bottom" as well as derivatives thereof (e.g., "horizontally," "vertically," "downwardly," "upwardly," etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. Additionally, the word "a" and "an" as used in the claims means "at least one" and the word "two" as used in the claims means "at least two". When "battery" is used herein, it is understood that said "battery" may be substituted with a capacitor instead.

FIG. 1 depicts a door assembly 10 according to an exemplary embodiment of the present invention, such as a pre-hung door. The door assembly 10 is a conventional hinged residential door assembly, and it should be understood that the door assembly 10 may be an exterior or interior door assembly provided for a residential or commercial building, such as a home, apartment, garage, condominium, hotel, office building, or the like. The door assembly 10 may be made of any appropriate material, such as wood, metal, wood composite material, fiberglass reinforced polymer composite or the like. The door assembly 10 includes a substantially rectangular frame assembly 12 and a door 14 pivotally attached thereto by at least one hinge $\mathbf{16}_1$, such as a "butt hinge" that includes two leaves.

The frame assembly 12 includes first and second parallel, spaced apart vertically extending jamb members $\mathbf{12}_1$, $\mathbf{12}_2$ and a horizontally extending upper jamb member or header 12*c* that connects upper ends of the first and second jamb members $\mathbf{12}_1$, $\mathbf{12}_2$. Those skilled in the art recognize that lower ends of the jamb members$\mathbf{12}_1$, $\mathbf{12}_2$ may be interconnected through a threshold 12*t*.

The at least one hinge $\mathbf{16}_1$ pivotally attaches the door 14 to the first jamb member $\mathbf{12}_1$. Typically, at least two hinges $\mathbf{16}_1$ and $\mathbf{16}_2$ are provided to secure the door 14 to the first jamb member $\mathbf{12}_1$. Preferably, as best shown in FIG. 1, three hinges $\mathbf{16}_1$, $\mathbf{16}_2$, $\mathbf{16}_3$ are used to secure the door 14 to the frame assembly 12. In the interest of simplicity, the following discussion will sometimes use a reference numeral 16 without a subscript numeral to designate an entire group of the hinges. For example, the reference numeral 16 will be sometimes used when generically referring to the hinges $\mathbf{16}_1$, $\mathbf{16}_2$ and $\mathbf{16}_3$.

The door 14 includes a rectangular inner door frame 20, a first (or exterior) door skin (or facing) 23 and a second (or interior) door skin (or facing) 24 secured to opposite sides of the inner door frame 20. The first and second door skins 23,24 are formed separately from one another. The door skins 23, 24 are secured, e.g., typically adhesively, to a suitable core and/or to opposite sides of the inner door frame 20 so that the inner door frame 20 is sandwiched between the first and second door skins 23,24. Typically, the first and second door skins 23, 24 are made of a polymer-based composite, such as sheet molding compound ("SMC"), or medium-density fiberboard (MDF), other wood composite materials, fiber-reinforced polymer, such as fiberglass, hardboard, fiberboard, steel, and other thermoplastic materials. The door 14 has a hinge side 14H mounted to the inner door frame 20 by the hinges 16, and a horizontally opposite latch side 14L.

The inner door frame 20 includes a pair of parallel, spaced apart horizontally extending top and bottom rails $\mathbf{21}_1$ and $\mathbf{21}_2$, respectively, and a pair of parallel, spaced apart vertically extending first and second stiles $\mathbf{22}_1$ and $\mathbf{22}_2$, respectively, typically manufactured from wood or an engineered wood, such as a laminated veneer lumber (LVL). The top and bottom rails $\mathbf{21}_1$ and $\mathbf{21}_2$ horizontally extend between the first and second stiles $\mathbf{22}_1$ and $\mathbf{22}_2$. Moreover, the top and bottom rails $\mathbf{21}_1$ and $\mathbf{21}_2$ may be fixedly secured to the first and second stiles $\mathbf{22}_1$ and $\mathbf{22}_2$, such as through adhesive or mechanical fasteners. The inner door frame 20 further may include a mid-rail. The mid-rail extends horizontally and is spaced from the top and bottom rails $\mathbf{21}_1$ and $\mathbf{21}_2$, respectively, and is typically also manufactured from wood or an engineered wood, such as a laminated veneer lumber (LVL). Moreover, the mid-rail may be fixedly secured to the first and second stiles $\mathbf{22}_1$ and $\mathbf{22}_2$. The hinges 16 are secured to the first stile $\mathbf{22}_1$, which defines a hinge stile of the inner door frame 20.

The inner door frame 20 and the first and second door skins 23, 24 of a typical door surround an interior cavity 15, which may be hollow or may be filled, for example with corrugated pads, foam insulation, or other core materials, if desired. Thus, the door 14 may include a core disposed within the inner door frame 20 between the first and second door skins 23, 24. The core may be formed from foam insulation, such as polyurethane foam material, cellulosic material and binder resin, corrugated pads, etc. The first and second door skins 23, 24 typically are identical in appearance and may be flat or flush or have one or more paneled portions.

The door assembly 10, according to the exemplary embodiment of the present invention, includes a number of electric devices (components) mounted to the door 14, and sometimes also on the inner door frame 20 of the door assembly 10, to provide functions, such as electronic access control, door state feedback, entry camera and audio/video communication, etc. Specifically, the electric devices that may be mounted to the door assembly 10 include, but are not limited to, a doorbell $\mathbf{36}_1$, a digital camera $\mathbf{36}_2$ and a threshold LED light $\mathbf{36}_3$, as best illustrated in FIG. 1. The threshold LED light $\mathbf{36}_3$ may illuminate when an authorized person is recognized or when someone gets close to the door 14. The electric devices $\mathbf{36}_1$-$\mathbf{36}_3$ typically are low-voltage DC electric devices operated by low-voltage DC electrical power (such as 5 volts (V), 12 volts, 24 volts or other required voltage). It should be understood that the door assembly 10 may include other electric devices, as there are a number of electric devices marketed to be mounted to doors and provide functions such as electronic access control, door state feedback, entry camera and communication, etc. In the interest of simplicity, the following discussion will sometimes use a reference numeral without a subscript numeral to designate an entire group of the electric devices. For example, the reference numeral 36 will be sometimes used when generically referring to the electric devices $\mathbf{36}_1$-$\mathbf{36}_3$.

Low voltage direct current (DC) is known in the art as 50 volts (V) or less. Common low voltages are 5 V, 12 V, 24 V, and 48 V. Low voltage is normally used for doorbells, garage door opener controls, heating and cooling thermostats, alarm system sensors and controls, outdoor ground lighting, and household and automobile batteries. Low voltage (when the source is operating properly) will not provide a shock from contact. However, a high current, low voltage short circuit (automobile battery) can cause an arc flash and possibly burns.

The door assembly 10 may include an electric powered door latch/lock 30 mounted to the door 14. As best illustrated in FIG. 1, the electric powered door latch/lock 30 includes a powered central latch bolt moveable between extended and retracted positions. As best illustrated in FIG. 1, the electric powered door latch/lock 30 is mounted to the latch side 14L of the door 14. Specifically, the electric powered door latch/lock 30 is mounted to the second stile $\mathbf{22}_2$, which defines a latch stile of the inner door frame 20. The electric powered door latch/lock 30 is preferably operated at low-voltage DC electrical power. The electric powered door latch/lock 30 may have a lighted doorknob 32 and/or a lighted keyhole.

As illustrated in FIG. 1, the door assembly 10 further comprises a primary battery (or battery pack) 40 that slides into one of the stiles (e.g., the second stile $\mathbf{22}_2$) of the door frame 20. While I illustrate the primary battery 40 as being located in stile $\mathbf{22}_2$, the primary battery 40 may be incorporated into a compartment in the door 14. The primary battery 40 is electrically connected to a DC power distribution block 42. The primary battery 40 has a low nominal voltage (such as 5 volts (V), 24 volts or other required voltage). The electric components 36 of door assembly 10 are powered and operated by the electrical power of the primary battery 40 as the primary electrical power source for the powered door latch/lock 30 and the electric devices $\mathbf{36}_1$-$\mathbf{36}_3$. The primary battery 40 is a rechargeable battery (or one or more battery packs) that is charged by low-voltage DC electrical power. Low-voltage DC electrical power is delivered from the power distribution block 42 to the electric powered door latch/lock 30 and the electric devices $\mathbf{36}_1$-$\mathbf{36}_3$ that are mounted to the door 14.

A plurality of electrical wires 45 electrically connect the low-voltage power distribution block 42 to the electric powered door latch/lock 30 and the electric devices $\mathbf{36}_1$-$\mathbf{36}_3$, thus electrically connecting the electric powered door latch/lock 30 and the electric devices $\mathbf{36}_1$-$\mathbf{36}_3$ to the primary battery 40. Alternatively, electrical connectors may be premounted in the door 14 at desired locations so that the electric devices $\mathbf{36}_1$-$\mathbf{36}_3$ may simply be inserted and plugged into the electrical connectors. A standard flange size and plug location relative to location of a flange of the electric components may be set so that suppliers may supply electric devices that are easily plugged into the door 14.

As illustrated in FIG. 1, the door 14 of the door assembly 10 further comprises a central electronic control unit (ECU) (or power management controller) 48 configured to be programmed to receive input from one or more sensors, such as a motion sensor (or motion detector), a proximity sensor, optical sensor, and send commands to the electric devices $\mathbf{36}_1$-$\mathbf{36}_3$, the electric powered door latch/lock 30, and also to a homeowner. The ECU 48 preferably is an electronic controller having firmware and/or associated software suitable for assuring operation of the ECU and its interaction with the electric devices 36 and associated sensors, if any. The central ECU 48 controls the electric powered door latch/lock 30 and the electric devices $\mathbf{36}_1$-$\mathbf{36}_3$. Accordingly, the central ECU 48 is in communication with the electric powered door latch/lock 30 and the electric devices $\mathbf{36}_1$-$\mathbf{36}_3$ through a communication bus (such as CAN, ethernet, serial) including data links $\mathbf{44}_1$, $\mathbf{44}_2$, $\mathbf{44}_3$ and 44L.

Figure 2:
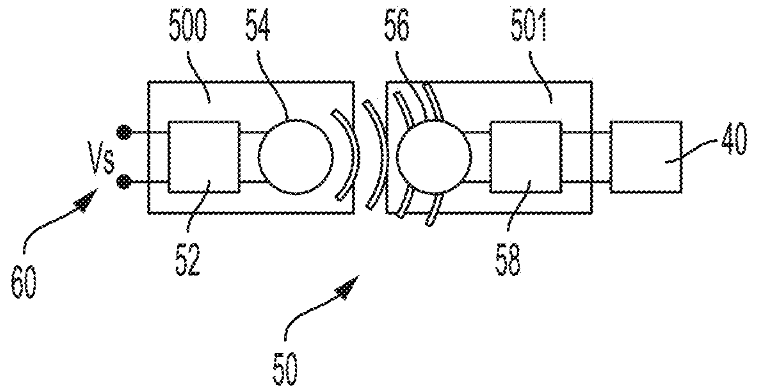
FIG. 2 is a diagram representation of a wireless power transfer system

The door assembly 10 includes a primary battery 40 for wireless charging, e.g., by a wireless power transfer system 50. Although FIG. 1 shows a primary battery 40, in certain embodiments, as described below, it is desirable to include a storage battery 300 to ensure that power is continuously available to operate the system. In general, the wireless power transfer system 50, as best illustrated in FIG. 2, comprises a power transmitting device (or power transmitter) 52, a transmitting antenna (or transmitting coupling device) 54 operatively connected to the power transmitter 52, a receiving antenna (or receiving coupling device) 56, and a power receiving device (or power receiver) 58 operatively connected to the coupling device 56. The power receiver 58 is operatively connected to the primary battery 40. The power transmitter 52 and the transmitting antenna 54 device collectively are referred to as the transmitter assembly 500. The receiving antenna 56 and the power receiver 58 collective are referred to herein as the receiver assembly 501.

The coupling device 56 and the power receiver 58 and primary battery 40 are preferably disposed in the door 14 of the door assembly 10, and the power transmitter 52 and the transmitting coupling device 54 are disposed outside the door 14 and are spaced from the door 14 and not in direct physical contact with the door assembly 10.

The power transmitter 52 is electrically connected to a stable (such as high voltage AC (such as 110 (or 120) V AC) or DC power source 60. Preferably, the power source 60 is supplied power by a wall plug typically found in residential or commercial buildings. The power transmitter 52 converts high voltage AC power from the power source 60 to a time-varying electromagnetic field. The transmitting coupling device 54 and the receiving coupling device 56 cooperate to transfer the time-varying electromagnetic field to the power receiver 58. In turn, the power receiver 58 receives the time-varying electromagnetic field and converts it to DC electric current, which is used to directly or indirectly charge the primary battery 40.

At the power transmitter 52 the input high voltage AC power is converted to an oscillating electromagnetic field by an "antenna" (or coupling device), such as the transmitting coupling device 54. The term "antenna" (or coupling device), as used herein, may be a coil of wire which generates a magnetic field, a metal plate which generates an electric field, an antenna which radiates radio waves, or a laser which generates light. A similar antenna or coupling device 56 at the power receiver 58 receives and converts the oscillating field to an electric current. One parameter that determines the type of waves is the frequency, which determines the wavelength.

There are several techniques that may be used to implement the wireless power transfer system 50: inductive coupling (transfer of electrical energy using electromagnetic induction between coils by a magnetic field); resonant inductive coupling (a form of the inductive coupling in which power is transferred by magnetic fields between two resonant circuits (tuned circuits), one in the transmitter and one in the receiver); capacitive coupling (transfer of electrical energy using electric fields for the transmission of electrical power between two electrodes (an anode and cathode) forming a capacitance for the transfer of power); magneto-dynamic coupling (transfer of electrical energy between two rotating armatures, one in the transmitter and one in the receiver, which rotate synchronously, coupled together by a magnetic field generated by magnets on the armatures); and microwaves (transfer of electrical energy via radio waves with short wavelengths of electromagnetic radiation, typically in a microwave range), and light waves (solar and infrared). The used of radio waves is most preferred, followed by infrared (IR), for wireless power transfer.

In one technique the power transmitter 52 generates a radio frequency (RF) power signal, and transfers the RF power signal to the power receiver 58 through the transmitting antenna 54 and the receiving antenna 56. The power receiver 58 receives and converts the input RF power signal to a charging electric current, preferably DC, and thereby inputs the converted charging electric current into the primary battery 40. Through the above process, the primary battery 40 may be directly or indirectly charged. Here, the RF power signal defines a transmitted power charge signal.

Figure 3:
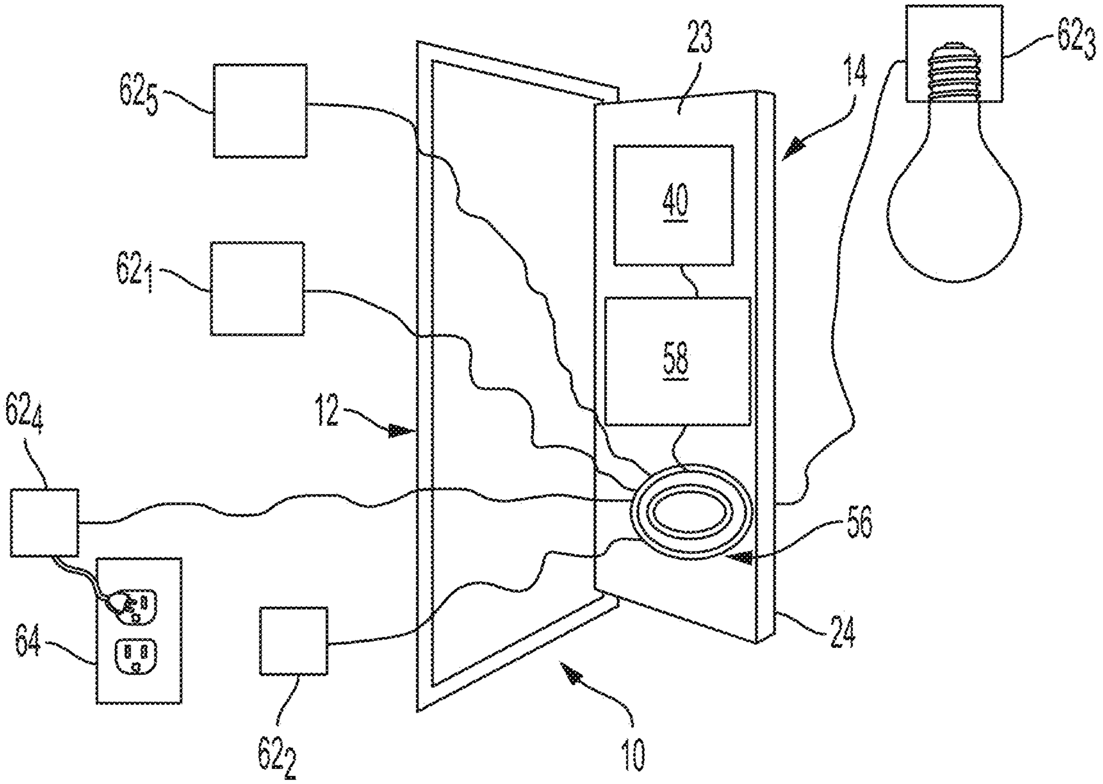
FIG. 3 shows an exterior door assembly including a wireless power transfer system with various locations for the transmitting device.

According to the present invention as best shown in FIG. 3, the power transmitter 52 may be installed in one or more locations remote from the door assembly 10, including but not limited to the following locations:

a light switch junction box $62_1$ located near the door assembly 10, the power transmitter 52 and transmitting antenna 54 fit inside of a light switch, e.g., on a wall of a building, assembled with the power transmitter 52 and transmitting antenna 54 built-in;

an electrical outlet $62_2$ located near the door assembly 10, the power transmitter 52 and transmitting antenna 54 fit inside of the electrical outlet $62_2$ manufactured with the power transmitter 52 and transmitting antenna 54 built in;

a lightbulb socket $62_3$ located near the door assembly 10, the power transmitter 52 and transmitting antenna 54 are built into the lightbulb socket $62_3$;

an external receptacle plug transmitter $62_4$, the power transmitter 52 and transmitting antenna 54 are built into the external receptacle plug transmitter $62_4$ that plugs into an electrical outlet 64; and a doorbell power transmitter $62_5$, the power transmitter 52 and transmitting antenna 54 are attached to existing doorbell wiring.

Figure 13:
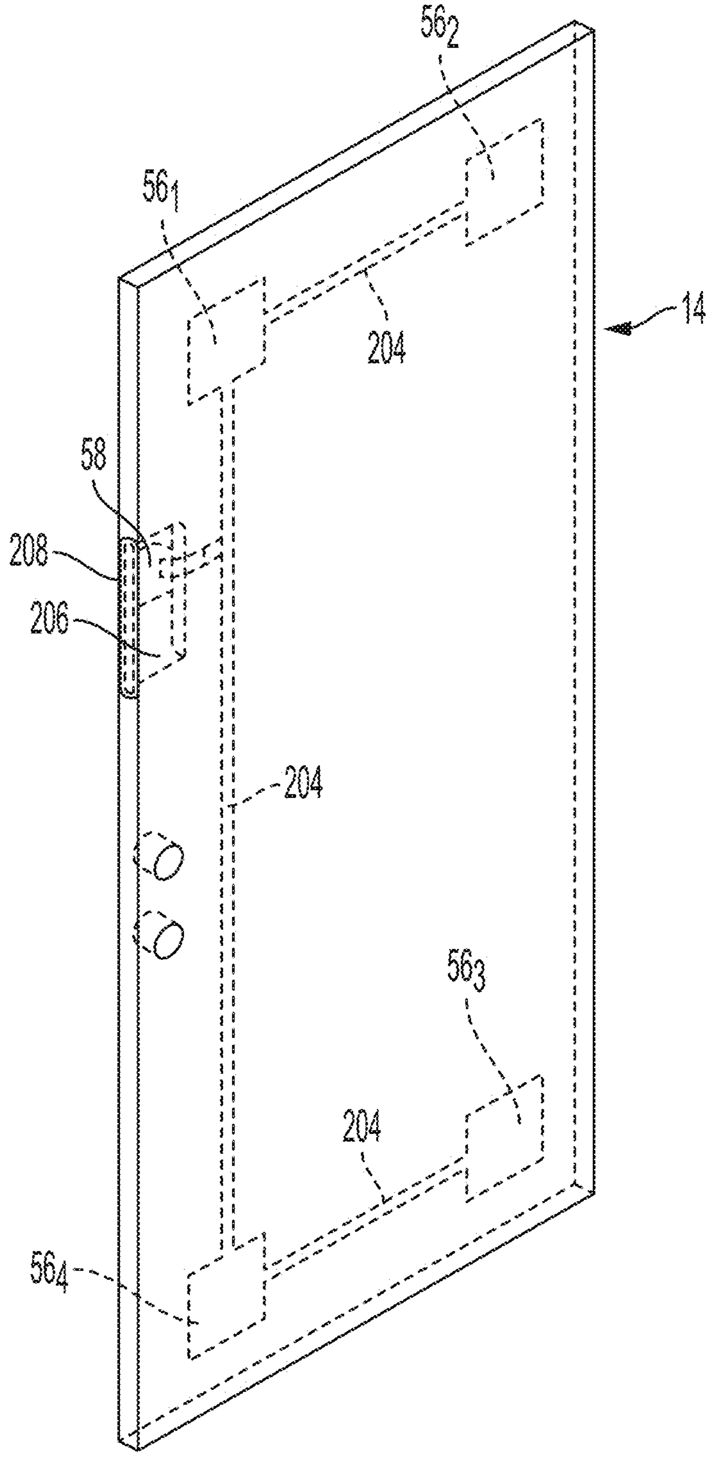
FIG. 13 shows an embodiment where multiple antennas/coils are used and are located at the corners of the door.
Figure 14:
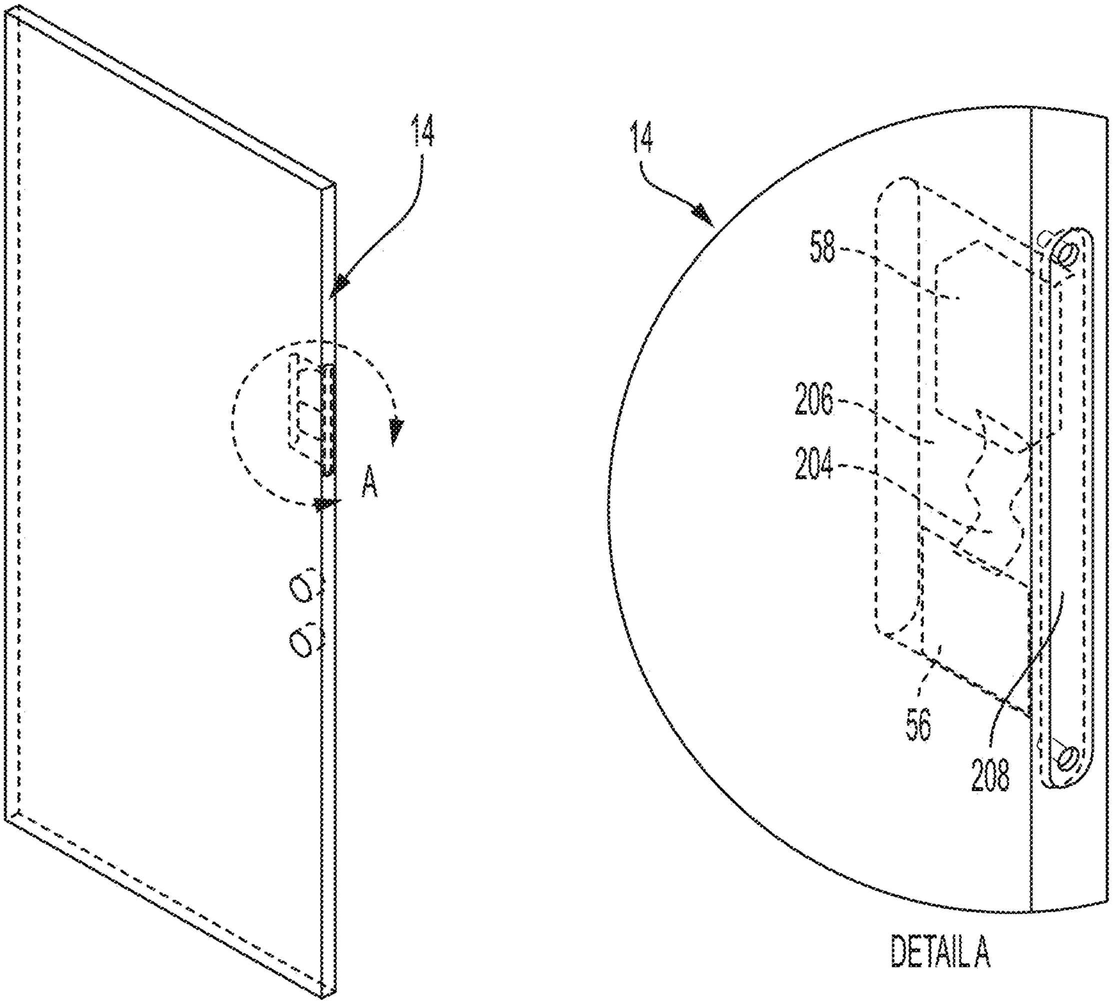
FIG. 14 shows an embodiment where the antenna/coil is located in an opening in the stile.
Figure 15:
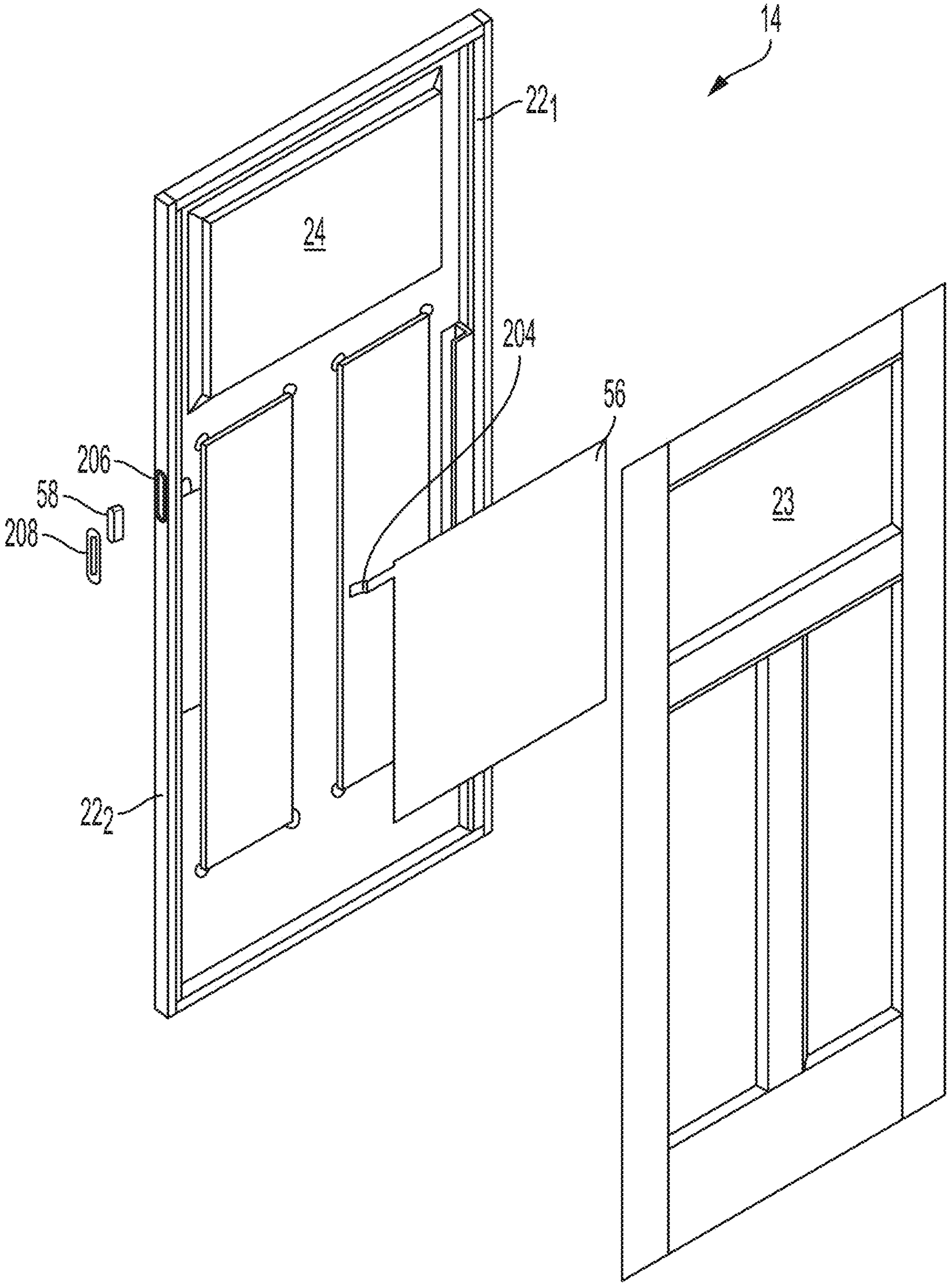
FIG. 15 shows an embodiment where a large antenna/coil is located at approximately the center of the door.
Figure 16A:
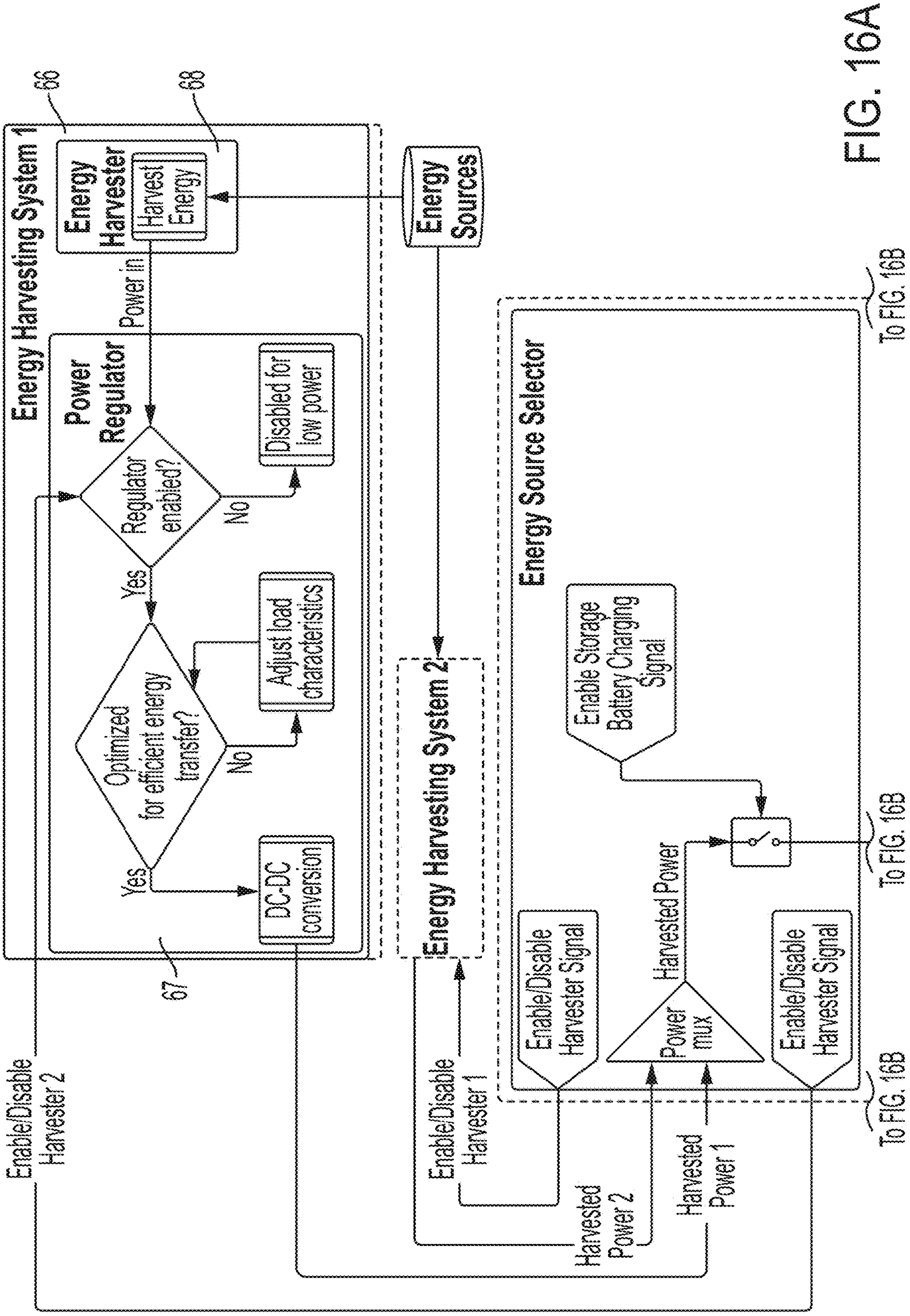
FIGS. 16A-C show details of the energy flow of the system.
Figure 16B:
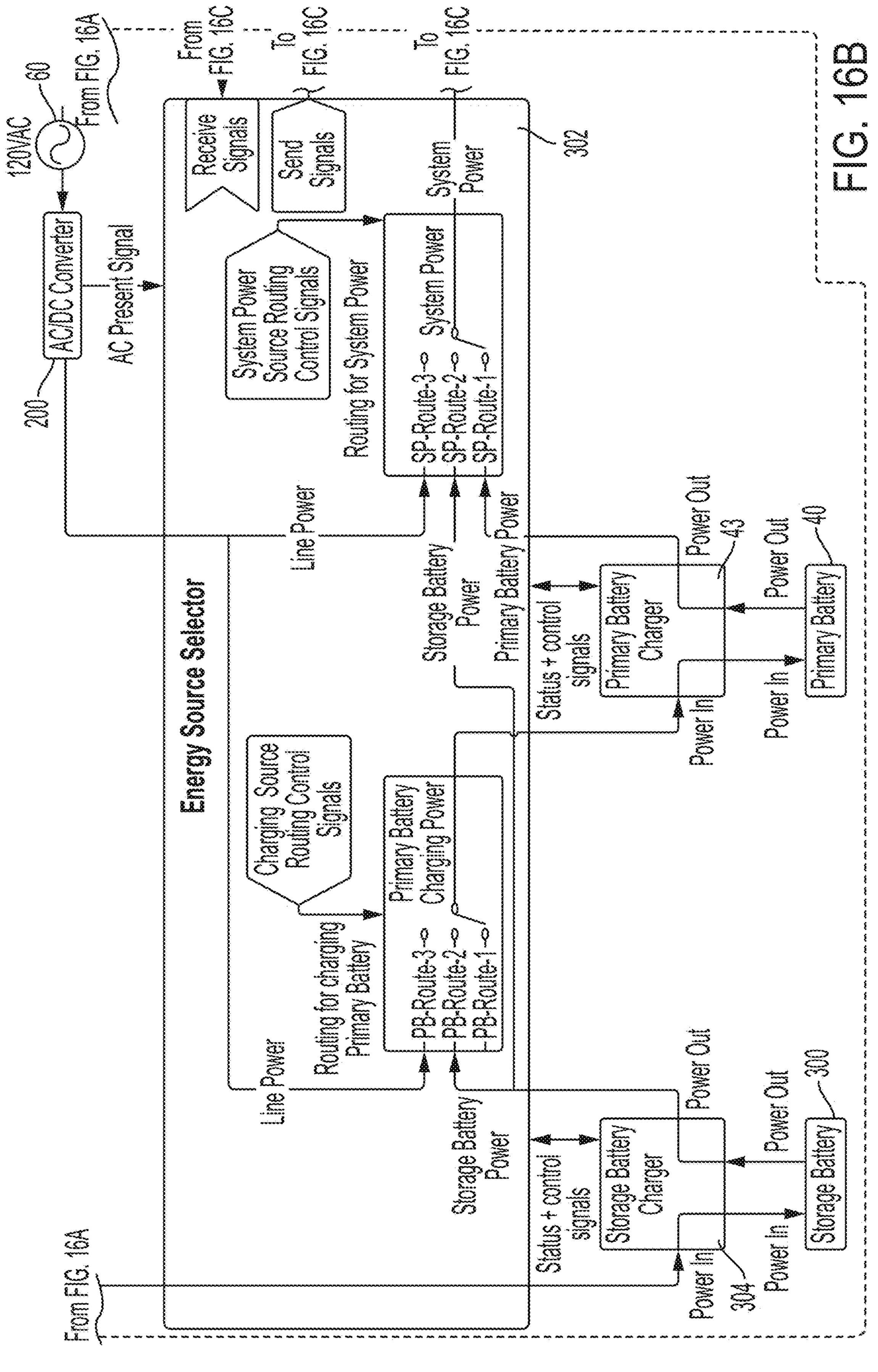
Figure 16C:
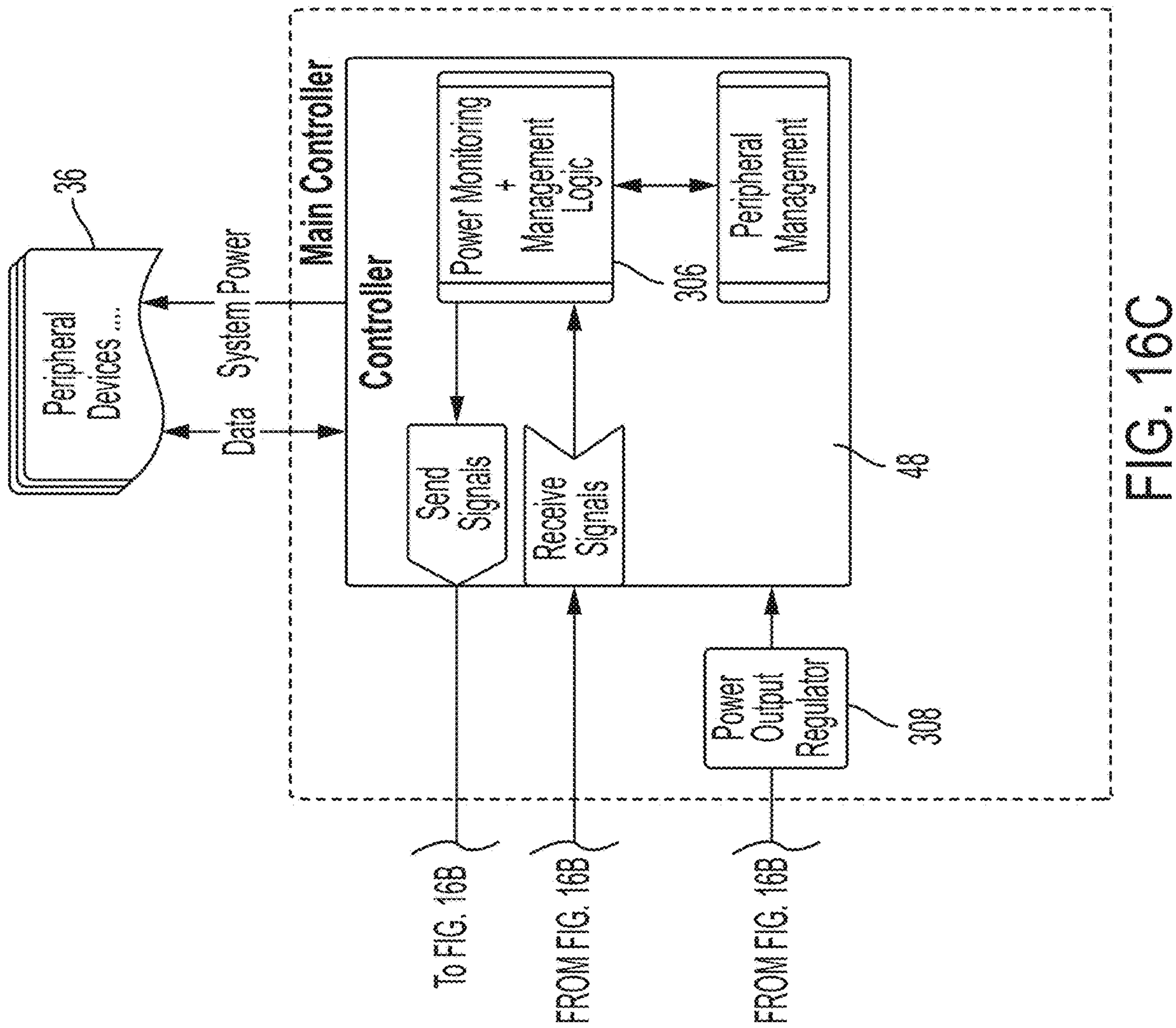

The receiving antenna 56 can be embedded into or attached to the door skin 23 or 24 of the door 14, which allows for great flexibility in the size and shape of the receiving antenna 56. Preferably, the receiving antenna 56 is adhesively attached the door skin 23 or 24 or is sandwiched between the door skin 23 or 24 and the stile $22_2$ or the door frame 20, or between the skin and a foamed middle section of the door. When attached to the door skin 23 or 24, the antenna 56 is attached to the surface of the door skin 23 or 24 that faces the interior of the door, so that the antenna 56 is not visible from the exterior of the door 14. FIGS. 13-15 show different exemplary embodiments of the receiving antenna 56 in the door 14. The antenna 56 may be a flat antenna or a coil. The invention, however, is not limited to those exemplary embodiments.

As shown in FIG. 13, the receiving antenna 56 includes four different sub-antennae $56_1$-$46_4$, each locating proximate a corner of the door 14. Although four different sub-antennae are shown in FIG. 13, any number may be used. The sub-antennae $56_1$-$46_4$ are connected together and to the power receiver 58, e.g., by ribbon cables 204. The power receiver is preferably located in an opening 206 in one of the stiles $22_1$ and $22_2$ of the door 14. The opening 206 is preferably covered by a covering 208 that is removeable to allow access to the power receiver 58. The different locations of the sub-antennae improves the efficiency of collecting power. Generally, the amount of RF power that can be captured is proportional to the distance the radio wave travels from transmitting antenna 54 to receiving antenna 56. So, a direct path allows more energy to be captured compared to a radio wave that bounces off a wall and then makes its way to the receiver. At time of manufacturing, it is usually not known where the transmitter will be located in relation to the receiving antenna, because the layout of the home and location of the door 14 installation is not known. For best performance the transmitting antenna 54 and receiving antenna 56 should be in line of sight to each other. As such having multiple sub-antennae at different locations on the door 14 allows for flexibility on where the transmitting antenna 54 can be located.

As shown in FIG. 14, the receiving antenna 56 and the power receiver 58 are both located inside the opening 206 in one in one of the stiles $22_1$ and $22_2$ of the door 14. The receiving antenna 56 is connected to the power receiver 58, e.g., by a ribbon cable 204. The opening is preferably covered by the covering 208 that is removeable to allow access to the receiving antenna 56 and the power receiver 58.

Figure 4A:
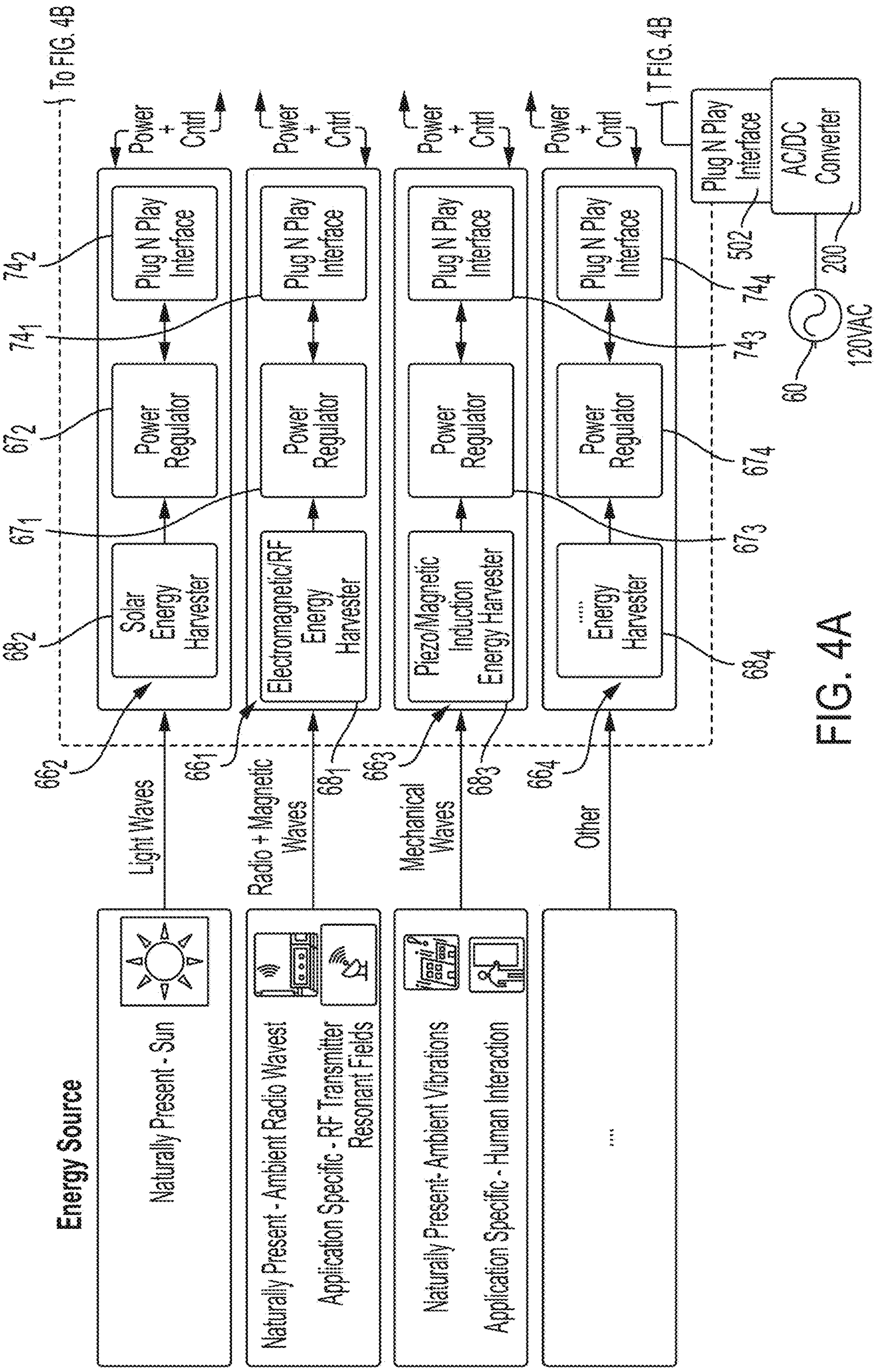
FIG. 4 is a functional block diagram of a door system with the wireless power transferring and battery charging technology built in according to the present invention.
Figure 4B:
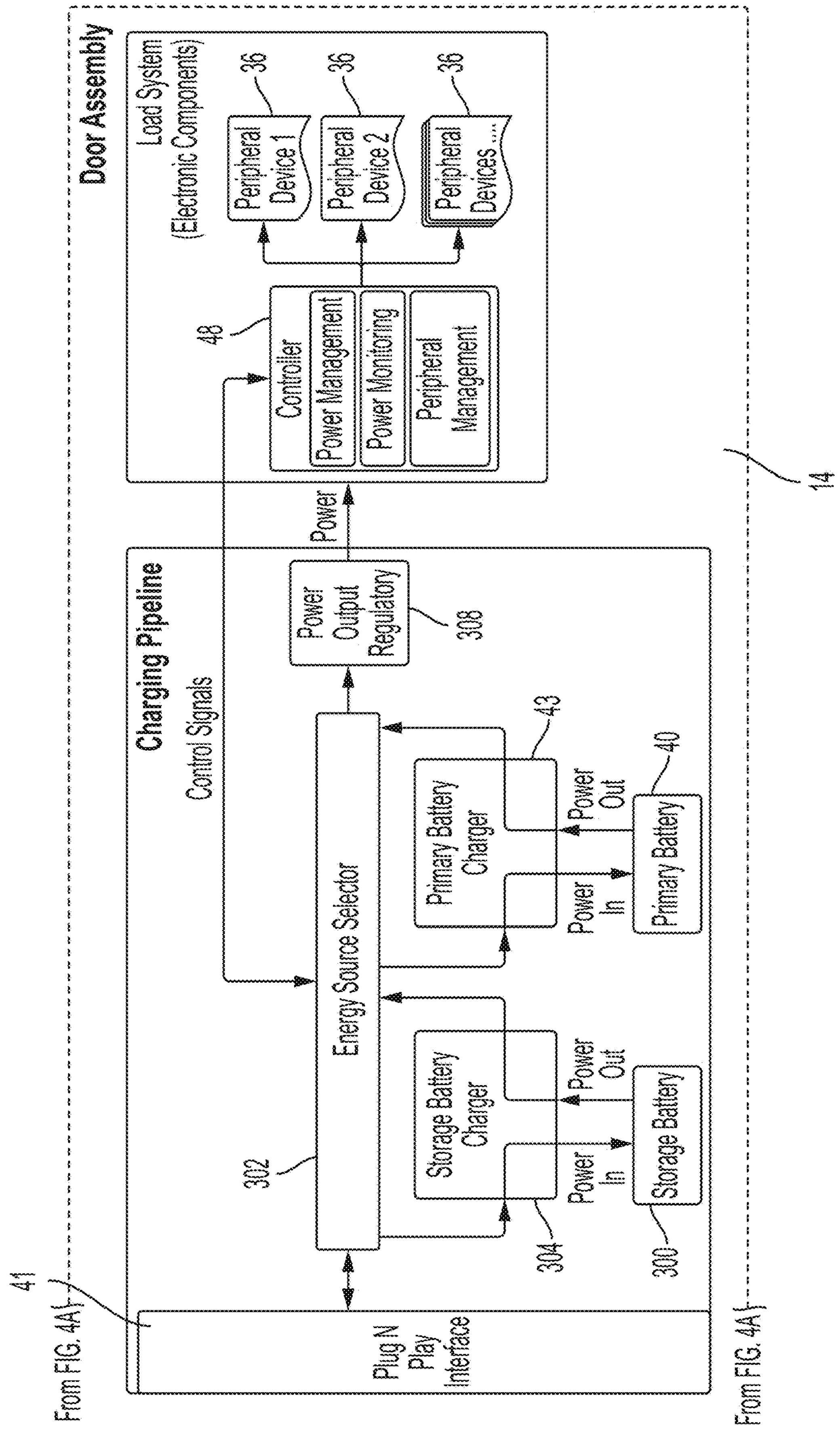

As shown in FIG. 15, the receiving antenna 56 is attached to approximately the center of the door skin 23 (or 24) and connected to the power receiver 58, e.g., via a ribbon cable 204. This location allows the antenna 56 to be very large. The power receiver 58 is located inside the opening 206 in the stiles $22_1$ (or $22_2$). The covering 208 covers the opening 206 and is removeable to allow access to the power receiver 58. A door assembly 10 according to a second exemplary embodiment includes a wireless power transfer system in the form of an external energy harvester system 66 for ultimately charging the primary battery 40. In general, the external energy harvester system 66, as best illustrated in FIG. 4, is based on harvesting (i.e., gathering) energy from one or more external energy sources to eventually charge the primary battery 40 of a door 14. External energy harvesters 66 and energy harvesting (also known as power harvesting or energy scavenging or ambient power) refer generally to apparatuses and processes or methods for collecting and storing energy present in the environment or derived from external energy sources (e.g., solar energy, thermal energy, wind energy, RF energy, salinity gradients, and kinetic energy such as low frequency excitation or rotation, also known as ambient energy), usually by converting the ambient energy to electricity for subsequent storage in a battery. The external energy sources are energy sources, such as electromagnetic radiation or mechanical energy, that are not delivered directly to the door 14 or door assembly 10 by wire. Typically, the ambient energy is captured and stored for small, wireless autonomous devices. Usually, the energy harvesters provide a very small amount of power for low-energy electronics. The energy source for some energy harvesters is naturally present in the ambient environment, while others are intentionally generated (i.e. application specific). The external energy sources are harnessed and converted to electrical energy to eventually charge the primary battery 40.

There are several external energy sources that can be harvested to charge the primary battery 40 of the door 14. Because every door installation is unique, the energy harvester system 66 is equipped with independent harvesters that are unique to the type of energy being harvested. Each harvester system 66 has a plug-n-play interface 74$_1$-74$_4$, which allows various external energy sources to be easily harvested by the energy harvester system 66 and which is configured to be connected to a plug-n-play interface 41 of the door 14 to eventually charge the primary battery 40 through a battery charger 43, as shown in FIG. 4. The plug-n-play interface 41 is located on the door 14 and contains electrical connectors which allow the plug-n-pay interfaces 74 of the energy harvester systems 66 to be plugged therein. The plug-n-play interfaces 41, 74 on the door 14 and the harvester systems 66 allow different energy sources to be quickly added and removed from the system. Each installation of the door assembly 10 will be unique and may not have all external energy sources available. For example, some door assembly might be installed in an area that does not have direct sunlight. In this scenario, the solar harvester system 66$_2$ is not required. Being able to update to a different eternal energy source in the field allows for flexibility of harvesting the right type of energy for that specific installation. It is difficult to predict what type of external energy sources will be present during the manufacturing process of the door. This allows the system to quickly customized in the field to harvest the most energy.

When the plug-n-pay interfaces 74 of the energy harvester systems 66 are plugged into the plug-n-play interfaces 41 on the door 14 the energy harvester systems 66 are electrically connected to the door 14. In FIG. 4, reference numerals 66$_1$-66$_3$ refer to an RF and magnetic wave energy harvester system, a solar energy harvester system, and a mechanical energy harvester system, respectively. Reference numeral 66$_4$ refers to any other energy harvesting system that may be used. The plug-n-play interface 41 on the door 14 preferably includes a plurality of electrical connectors for mating with the plug-n-play interfaces 74 of the energy harvester systems 66. Additionally, the plug-n-play interface 41 on the door 14 may include one or more connectors for mating with an electrical connection for direct wired connection to a high voltage AC power source 60. As shown in FIG. 4, the door 14 also include a rechargeable storage battery 300. Because a battery cannot be discharged and charged at the same time, the storage battery 300 is used for charging the primary battery 40 via charger 43 and provide power to the system (ECU 48, smart lock 30, and electric devices 36) when the primary battery 40 needs recharging. When the primary battery 40 has sufficient power to operate the system, the storage battery 300 is charged by the energy harvester systems 66 via charger 304. The storage battery 300 is used to store the harvested energy. Since the various external energy sources may not have consistent power delivery, the storage battery 300 is required to store that energy whenever it is available. The storage battery 300 should have a large capacity to store a large amount of energy so it can recharge the primary battery 40 multiple times, preferably at least two (2) times. When the primary battery 40 needs to be charged, the storage battery 300 is also used to power the system while also recharging the primary battery. When the storage battery 300 is being used to charge the primary battery 40, because a battery cannot be discharged and charged simultaneously, the harvester systems are also disabled so that no charging of the storage battery 300 is available. The chargers 43 and 304 are used to charge the batteries 40 and 300, respectively. The battery charges are used to control the charging and discharging of the attached battery. The chargers 43 and 304 also provide charge and charging status of their respective batteries 40 and 300 to the ECU 48. The chargers 43 and 304 also include battery protective functions including, but not limited to, preventing over current/under current, over voltage/under voltage, overcharge/deep discharge, and temperature extremes (too hot, too cold). Detailed description of the operation of the charging of the primary battery 40 and storage battery 300 is provided below.

In turn, the primary battery 40 is connected to the ECU 48, electric powered door latch/lock 30, and the electric devices 36 through a power output regulator 308 which regulates the power needed to run the system. The power required to power the electrical devices 36 on the door 114 are controlled by the output power control (ECU) 48. Depending on the available external energy sources, not all harvesters 66 are installed on the door 14. As an example, a home that has a door with limited sunlight may not have a solar energy harvester installed. The ECU 48 can automatically detect if specific energy harvester 66 is installed, via a signal on the plug-n-play interfaces 41 and 74. Each energy harvester 66 is equipped with a dedicated power regulator 67 and energy capturing circuit (i.e. harvester 68) that is unique to that type of harvested energy. The energy harvester systems 66 also allow for multiple energy sources to be harvested simultaneously. These features allow the system to adapt to the available energy, since each energy source may not always be present or have the same level of energy present at all times (i.e. could be cloudy, thus less solar energy to harvest). Several of these energy harvesters 66 may be used together to reliably produce enough energy to power the door 14 or recharge its batteries (300 and/or 40). The various energy that can be harvested may include but not limited to the following, as best shown in FIGS. 4 and 12:

- naturally present ambient-radiation sources (RF (Radio Frequency) energy harvesting), wherein the energy comes from a transmitter that transmits radio waves. For example, the home's Wi-Fi system transmit radio waves which can be harvested and used as an energy source. An RF and electromagnetic wave energy harvester system 66$_1$ includes an energy harvester 68$_1$ electrically connected to the storage battery 300.

Radio or electromagnet waves may also be intentionally delivered to the door 14. Such example is shown in FIG. 2 and discussed above. Power from the high voltage AC power source 60 may be delivered to the door 14, e.g., via RF and/or electromagnetic energy as explained below and in FIG. 2 and FIGS. 12A-B.

photovoltaic (solar energy), wherein the door 14 is provided with a solar energy harvester system $\mathbf{66}_2$ including a solar harvester $\mathbf{68}_2$ in the form of one or more solar panels 70 built into an exterior skin of the door 14 or adjacent the door 14, such as on an adjacent wall;

a mechanical energy harvester system $\mathbf{66}_3$, wherein the mechanical strain of the door closing on a piezoelectric material of one or more piezoelectric/magnetic harvesters $\mathbf{68}_3$ can be used to generate power to charge the storage battery 300 (and indirectly, the primary battery 40). The piezoelectric harvester(s) $\mathbf{68}_3$ may be incorporated into one or more of the hinges 16 or inside the door 14 and connected to storage battery 300. Alternatively, vibration energy or kinetic energy of the door 14 slamming or other natural vibrations found in a home can also be harvested to generate energy; alternatively the mechanical energy harvester $\mathbf{66}_3$ can use electromagnetic induction (or kinetic energy) to harvest energy, wherein electric power can be generated by a changing magnetic field. The changing magnetic field can be created by rotation of the door 14 during opening and/re closing thereof. Alternatively, the changing magnetic field can be created by vibration during door slamming, or other natural vibrations found in a home. One or more electromagnetic induction devices can be used to generate power to charge the storage battery 300.

In addition to an energy harvester 68, each of the energy harvester system 66 also includes a power regulator 67 locating between the energy harvester 68 and the plug-n-play interface (see FIGS. 4 and 16A-C). The most efficient way to harvest as much energy as possible is to have separate energy harvester 68 and power regulator 67 for each type of external energy source and then to combine the collected energies after each independent power regulator 67. The power regulator 67 performs, but is not limited to, the following functions 1) regulates the harvested power so it can be stored effectively; 2) tunes the load characteristics to optimize the energy transfer of the harvester system; and 3) regulates the output voltage and current. Many harvester systems, particularly solar, benefit from a process called Maximum Power Point Tracking (MPPT) or similar technology. Because of this, it is usually most efficient to tune the energy harvester system 66 to collect energy most efficiently from the specific source that is being used. Likewise, attempting to tune an anergy harvester system 66 to harvest from two distinctly different sources simply results in a system which performs significantly sub-optimally compared to a similar system which used two separate energy processing pipelines. When harvesting from certain sources only a small voltage may be induced, sometimes well below 0.5V. As such, most modern transistor technology only functions with a voltage difference of 0.7V or higher, which means custom parts intended to function at low input voltages must be selected to efficiently harvest certain energy sources. Thus, the importance of using components that are specifically chosen for the source of energy being harvested. Rather than being powered from the harvested energy directly, the power regulator 67 can also be powered from the door system (i.e., the primary battery 40 or the storage battery 300) to allow certain integrated circuits (ICs) to startup correctly. Certain ICs require a minimum input voltage to begin functioning before the input can be further lowered to their regular working voltage. For example, a chip may be rated to operate with an input of 0.2V, but it may require a start-up voltage of 2.6V to begin functioning. This means that if the design is only capable of producing 0.5V, other circuitry which can get the chip to the required 2.6V for start-up would be necessary, otherwise the chip will never begin to function. Having the door system provide the power for the power regulator 67, allows for the use of more commonly available regulators which can lower the cost of the system. Powering the power regulator 67 directly from the harvested energy may require the use of custom power regulators that have extremely low start up voltages, which can increase the cost of the system. The power regulator 67, in certain embodiments, may be turned off or put in sleep mode to consume no energy when not needed. For example, the power regulator $\mathbf{67}_2$ of the solar harvester system $\mathbf{66}_2$ may be controlled by the ECU to turn off at night so that it is not consuming any energy when there is no solar energy to be harvested.

Figure 5:
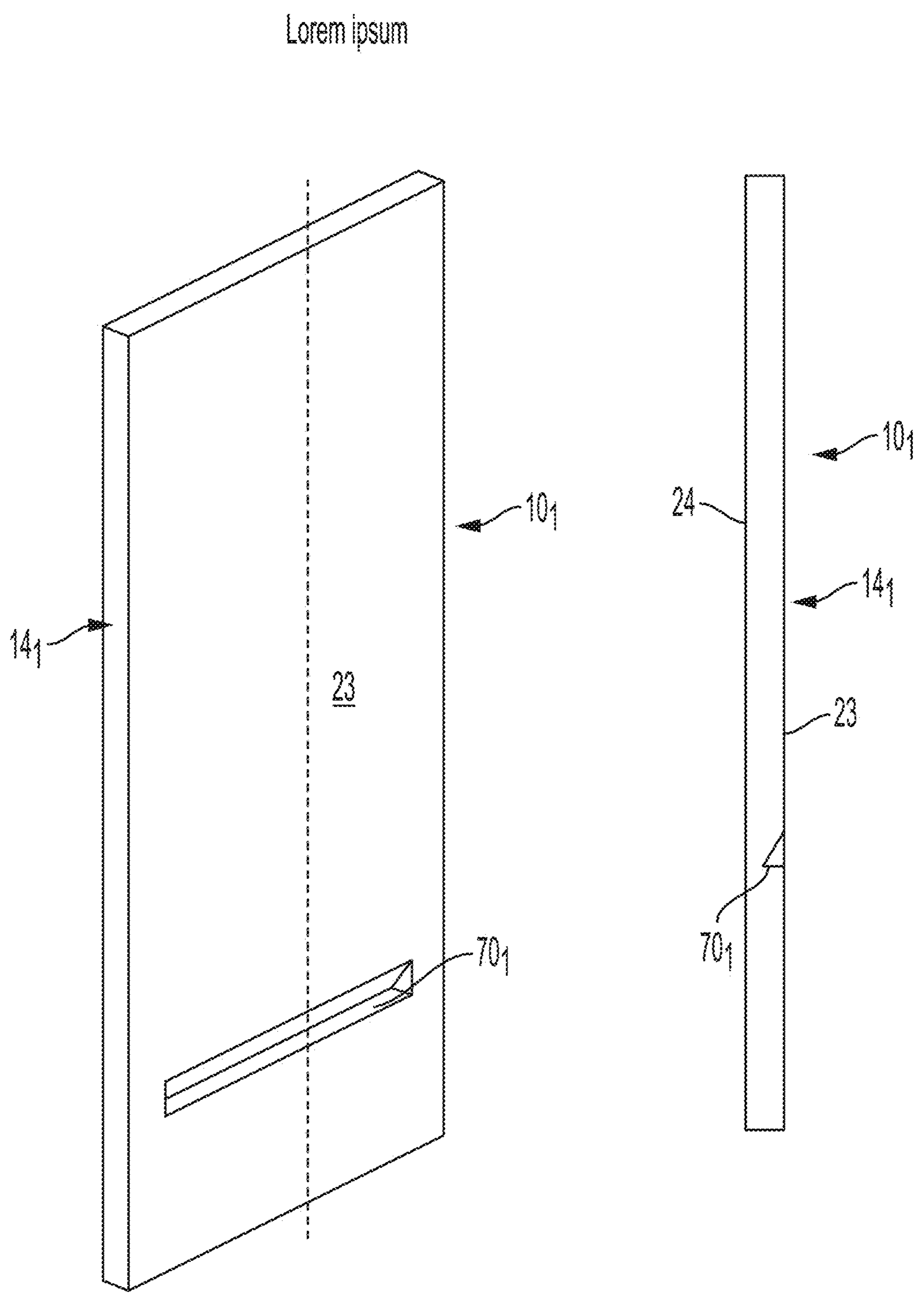
FIG. 5 shows an exterior door assembly including a first exemplary solar energy harvester system according to the present invention.

A door assembly $\mathbf{10}_1$, as best shown in FIG. 5, includes a solar panel $\mathbf{70}_1$ as solar harvester $\mathbf{68}_2$. The solar panel $\mathbf{70}_1$ is built into the exterior skin 23 of door $\mathbf{14}_1$. The solar panel $\mathbf{70}_1$ is disposed within the door $\mathbf{14}_1$ and is oriented orthogonal to the exterior skin 23, so as to be visible from the outside of the door $\mathbf{14}_1$, as best shown in FIG. 5. In this way, the solar panel $\mathbf{70}_1$ is exposed to ambient solar radiation, which may be converted to electrical energy as is known in the art. Solar panels are available in various sizes and energy outputs.

Figure 6:
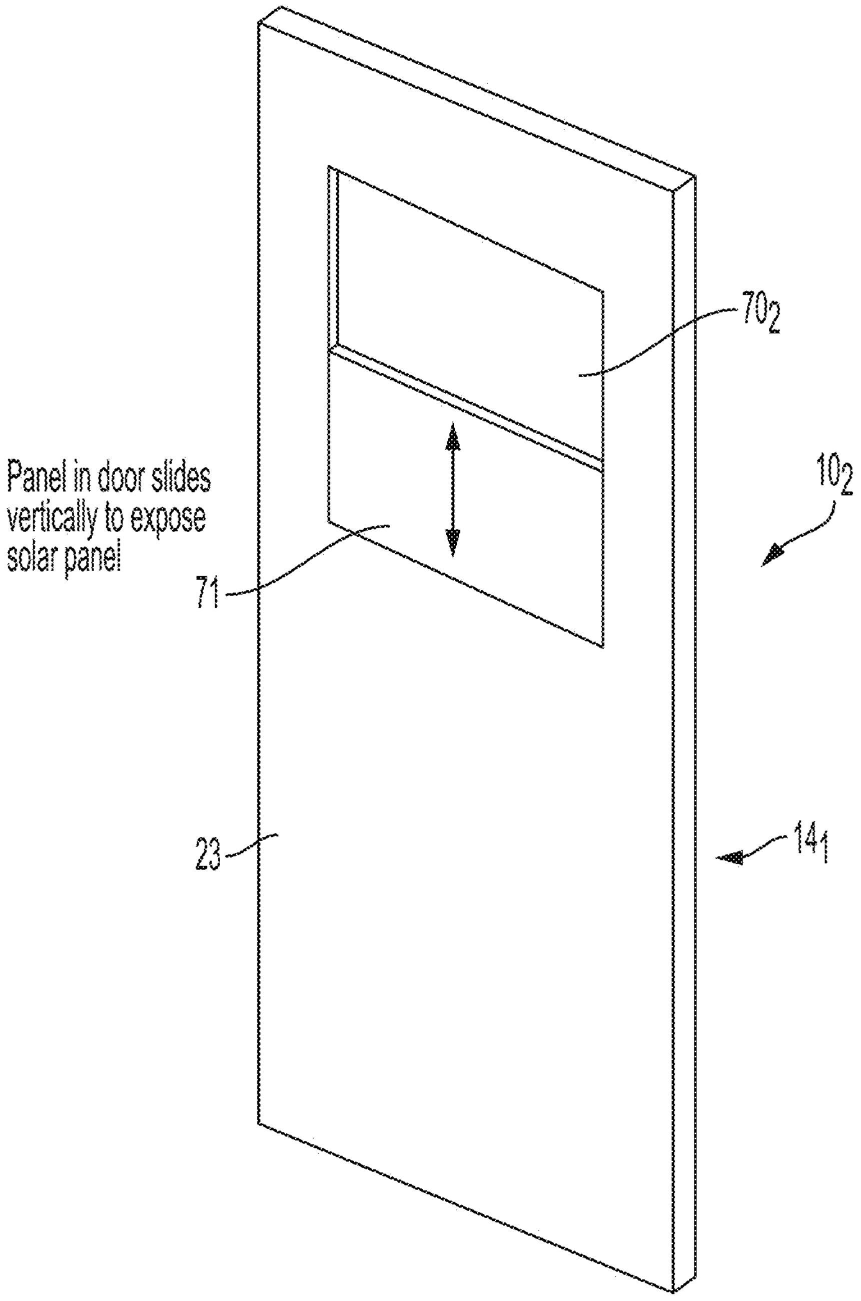
FIG. 6 shows an exterior door assembly including a second exemplary solar energy harvester system according to the present invention.

In door assembly $\mathbf{10}_2$ shown in FIG. 6, the solar panel $\mathbf{70}_1$ is replaced by a solar panel $\mathbf{70}_2$. The solar panel $\mathbf{70}_2$ is mounted to door $\mathbf{14}_2$ so as to be visible from the outside of the door $\mathbf{114}_2$, as best shown in FIG. 6. The door $\mathbf{14}_2$ further includes a door panel 71 sliding vertically to expose the solar panel $\mathbf{70}_2$ when in the retracted position and to block the solar panel $\mathbf{70}_2$ when in the raised position. The door panel 71 may be raised, such as to protect the solar panel $\mathbf{70}_2$ from harsh environments (rain, hail, flying debris, extreme temperatures) that may cause damage. The door panel 71 may be able to be raised and lowered controlled, e.g., by the ECU 48. Additionally, the door panel 71 may also be raised when no sunlight is detected, thus allowing the door to have better aesthetics when the solar panel 70 is not in use. For example, optical sensors detecting available sunlight and open the door panel 71 when sunlight is available. The door panel 71 preferably is motor operated, and may be activated by the homeowner, such as through an app or may be activated by sensors located in the door 14.

Figure 7:
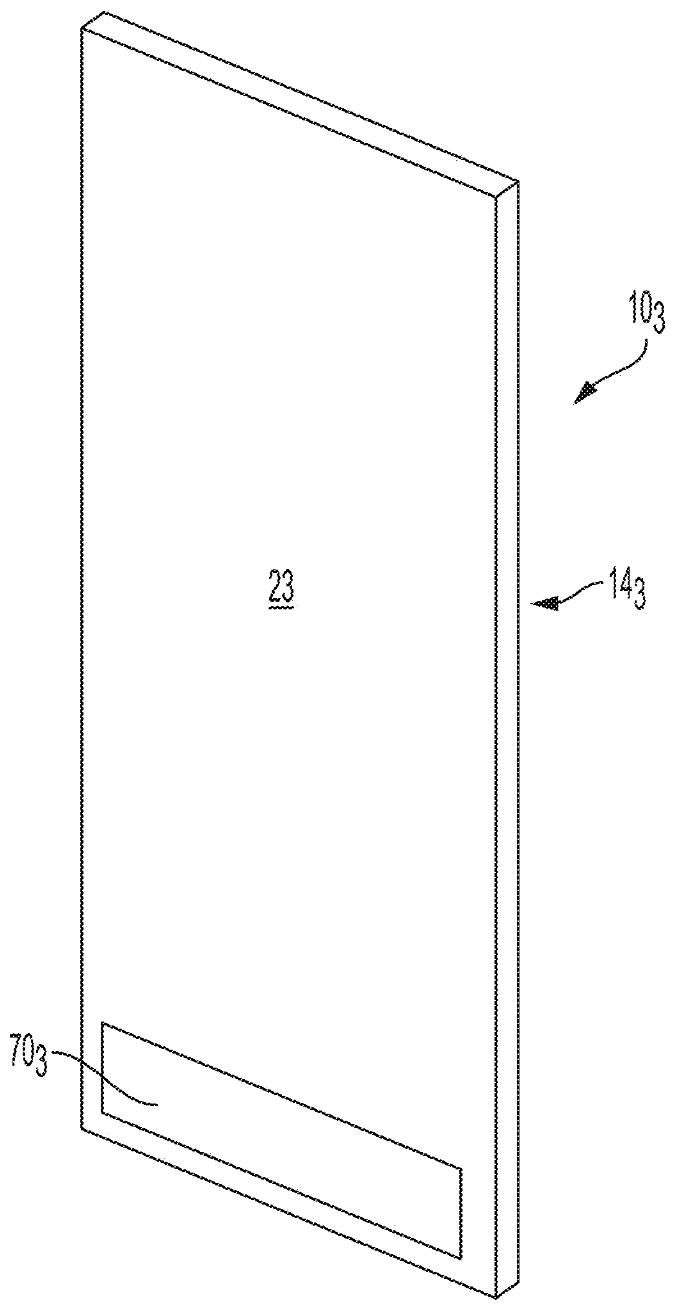
FIG. 7 shows an exterior door assembly including a third exemplary solar energy harvester system according to the present invention.

In door assembly $\mathbf{10}_3$ shown in FIG. 7, the solar panel $\mathbf{70}_1$ is replaced by a solar panel $\mathbf{70}_3$. The solar panel $\mathbf{70}_3$ is mounted to a bottom of an exterior skin 23 of a door $\mathbf{14}_3$ so as to be visible from the outside of the door $\mathbf{14}_3$, as best shown in FIG. 7. In this position the solar panel 70 will appear as a kick plate which is a common feature on doors, thus limiting potential negative impact on the door's overall aesthetics. The panel may be constructed with materials, e.g., hardened panel, to protect it from the harsh environment.

Figure 8:
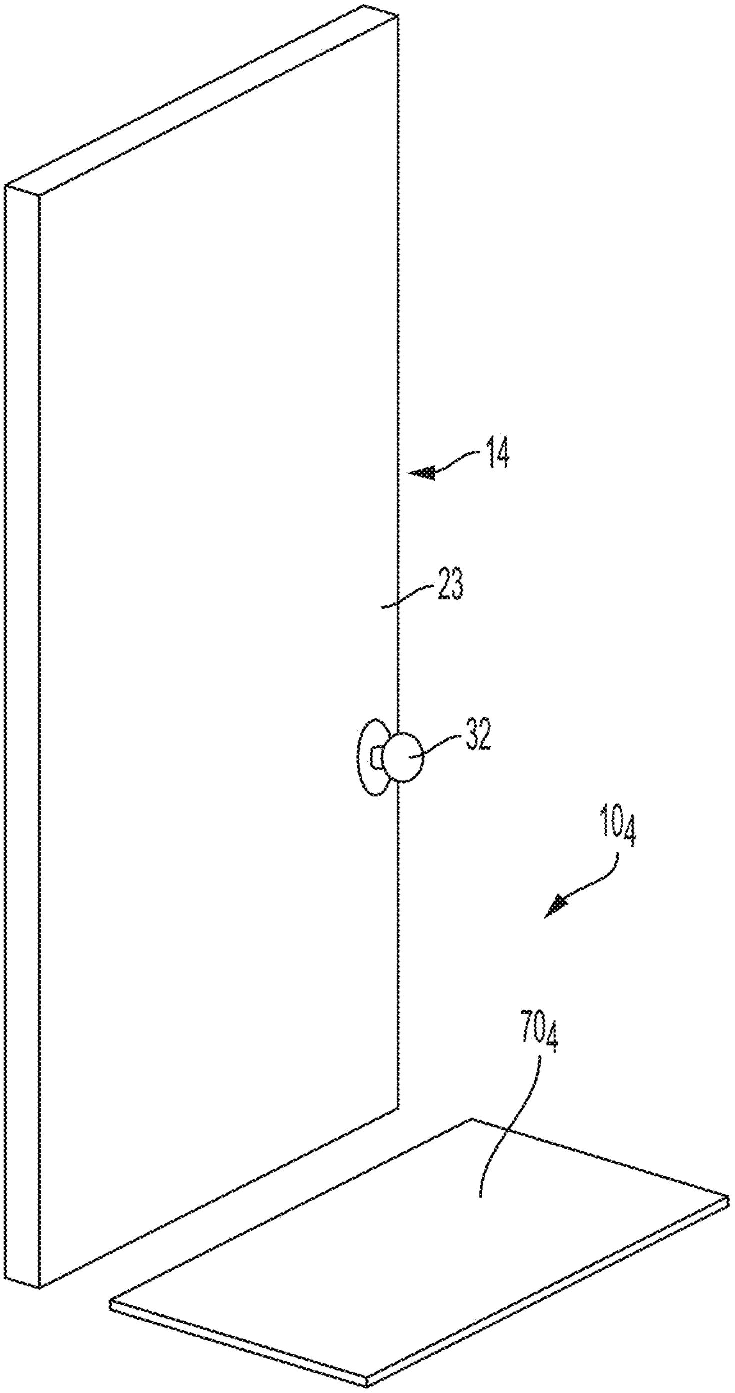
FIG. 8 shows an exterior door assembly including a fourth exemplary solar energy harvester system according to the present invention.

In door assembly $\mathbf{10}_4$ shown in FIG. 8, the solar panel $\mathbf{70}_1$ is replaced by a solar panel $\mathbf{70}_4$. The solar panel $\mathbf{70}_4$ is disposed in front of the door 14, such as a welcome mat, as shown in FIG. 8. The solar panel $\mathbf{70}_4$ may be connected to the door 14 by a cable which may be plugged into the plug-n-play interface 41. The amount of energy a solar panel can capture is proportional to its surface area. The larger the panel, the more energy it can capture. Therefore, its size is dependent on the energy draw of the system. But that consideration must be considered a tradeoff between aesthetics and more power. Alternatively, the solar panel $70_4$ may be is replaced by a welcome mat that has a piezoelectric plates embedded into the mat. In this embodiment the mat acts as an piezoelectric energy harvester, where energy is created every time a user steps on the mat.

Figure 9:
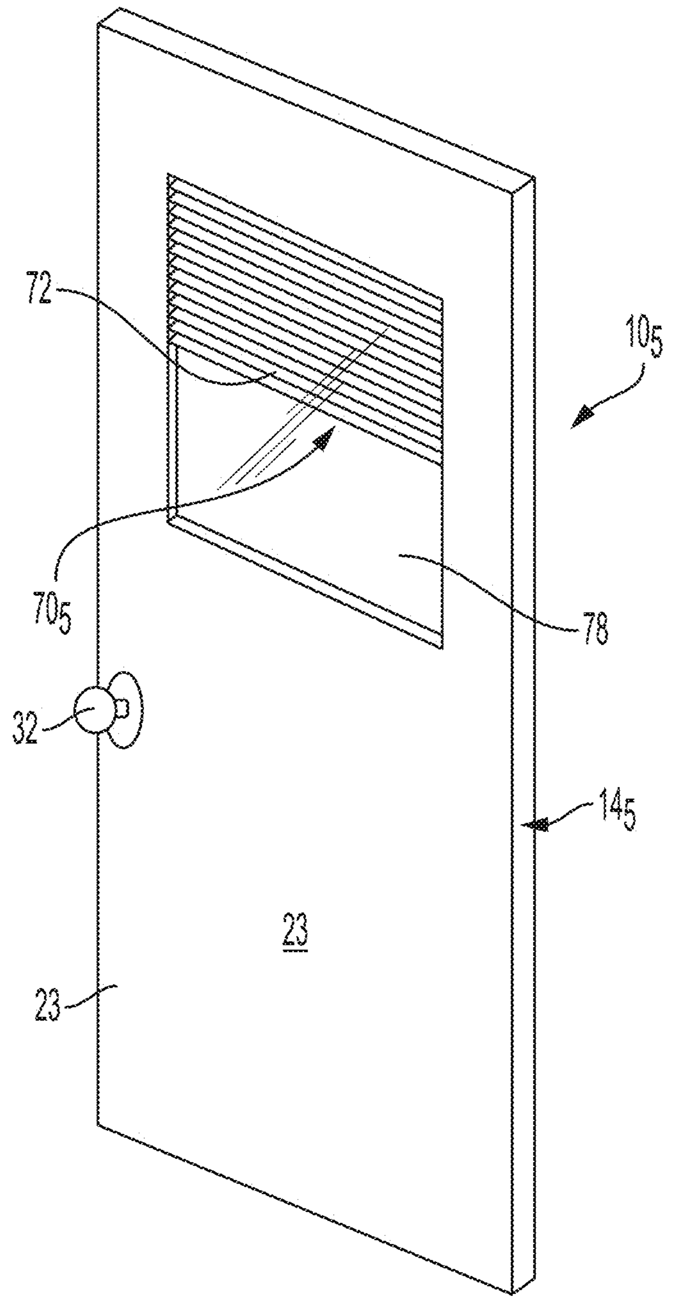
FIG. 9 shows an exterior door assembly including a fifth exemplary solar energy harvester system according to the present invention.

In door assembly $10_5$ shown in FIG. 9, the solar panel $70_1$ is replaced by a solar panel $70_5$ provided for covering a door lite 78. The solar panel $70_5$ is mounted to door $14_5$ so as to be visible from the outside of the door $14_5$, as shown in FIG. 9. The solar panel $70_5$ is defined by a plurality of individual blind slats 72, each slat covered by an individual photo-voltaic (PV) module. The solar panel $70_5$ forming window blinds slides vertically to close or open the door lite 78. The window blinds preferably fold up on each other to save space in the door. The photo-voltaic (PV) modules each converts solar energy to electricity. The photo-voltaic (PV) modules are interconnected and collectively connect through appropriate wiring to the power regulator $67_1$. The blinds can be automatically and manually opened/closed. This may be controlled by the ECU 48 which can use sensors located in the door assembly $10_5$ Commands received from the cloud/app may also trigger the opening/closing of the blind.

Figure 10:
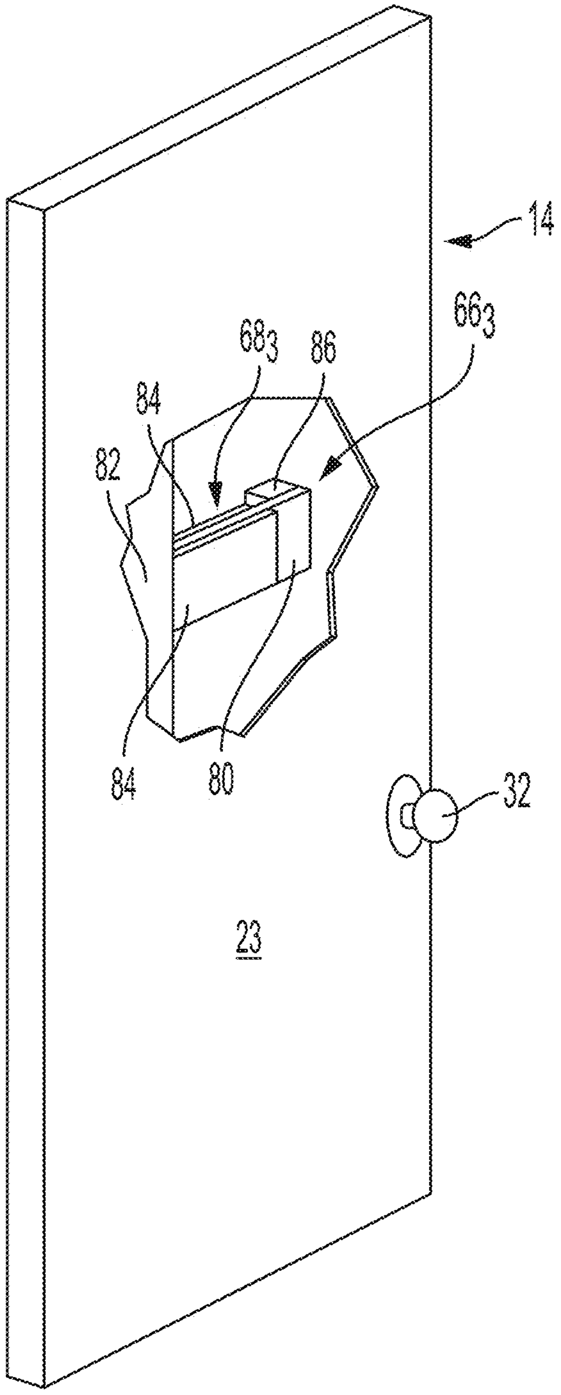
FIG. 10 shows an exterior door assembly including a piezoelectric energy harvester system according to the present invention.

FIG. 10 depicts an exemplary piezoelectric energy harvester system $66_3$ including a piezoelectric harvester $68_3$ disposed within the door 14. The piezoelectric harvester $68_3$ comprises a flexible cantilever beam 80 secured to a fixed rigid support 82, front and rear piezoelectric plates 84 secured to front and rear surfaces of the flexible cantilever beam 80, and a proof mass 86 secured to a free distal end of the cantilever beam 80. When the door 14 is opened or closed, the proof mass 86 moves relative to the fixed rigid support 82, and deforms the flexible cantilever beam 80 and the piezoelectric plates 84. The piezoelectric plates 84 when deformed generate the electric current used to recharge the storage battery 300.

Figure 11:
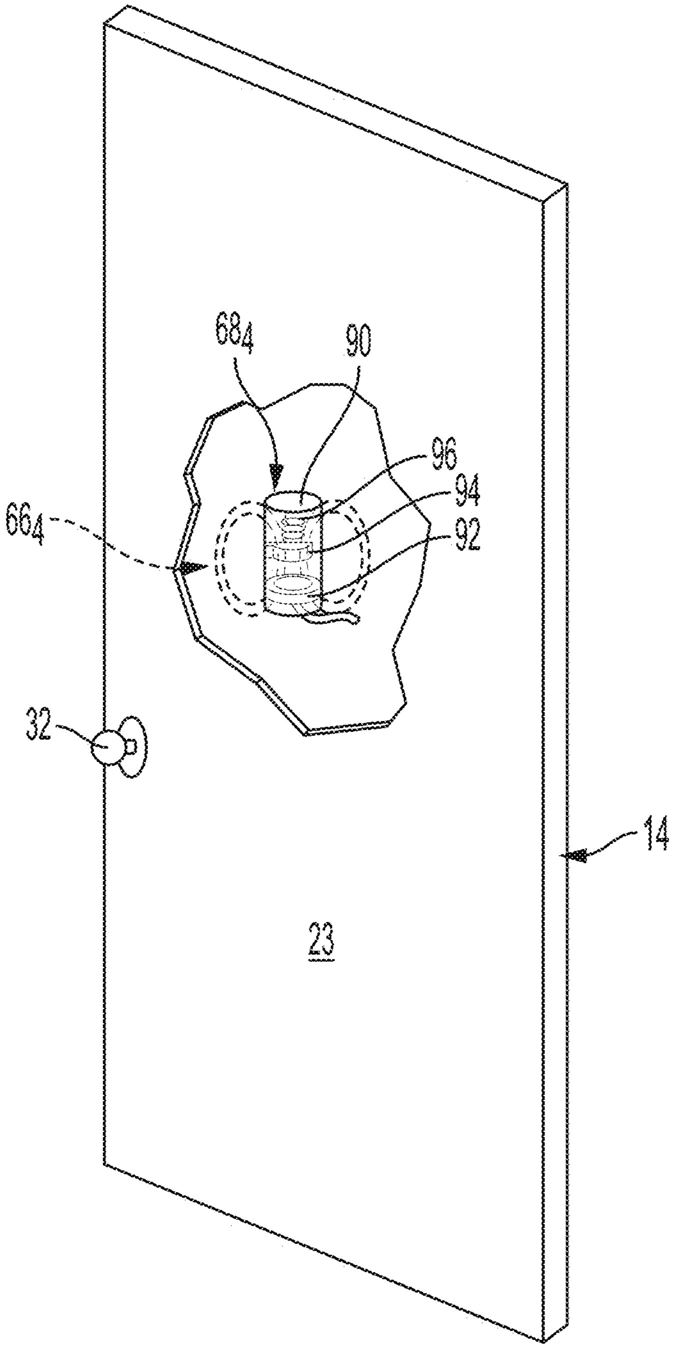
FIG. 11 shows an exterior door assembly including a kinetic energy harvester system according to the present invention.

FIG. 11 depicts an exemplary kinetic energy harvester system $66_4$ including a kinetic energy harvester $68_4$ disposed within the door 14. The kinetic energy harvester $68_4$ comprises an elongated (such as cylindrical) casing 90, an electromagnetic coil 92 mounted at one of opposite distal ends of the casing 90, and a magnet 94 rectilinearly moveable to and from the electromagnetic coil 92. Moreover, the magnet 94 is elastically biased toward the electromagnetic coil 92 by a coil spring 96. When the door 14 is opened or closed, the proof mass 86 moves relative to the fixed rigid support 82, the magnet 94 rectilinearly slides within the casing 90 to and from the electromagnetic coil 92, thus generating electric current in the electromagnetic coil 92, which is used to recharge the primary battery 40 via the storage battery 300.

Therefore, a door assembly according to the present invention does not require an always present, wired external power source, and thus is less expensive and easier to install (no need for an electrician) for a homeowner or user. The door assembly of the present invention also solves the problem of the user having to solely rely on a manual action to recharge the battery of the door or peripheral devices. Also, instead of trying to completely power the door using external wireless energy sources (which available power may be inconsistent and unpredictable), the wireless power system of the present invention slowly charges the battery. For this reason, the wireless power transfer system of the present invention does not need to transmit a large amounts of electrical power during a short interval, thus allowing the transmitting assembly 500 to be compact. Convenient installation options of the plug and play interfaces allow the wireless power system of the present invention to be easily configured in the field and installed by an unskilled individual.

Preferably, the storage battery 300 can be charged by more than one energy sources, including an on-demand high voltage AC power source 60 (direct wired connection), a solar energy harvester system $66_2$, Radio or magnetic wave energy harvester system $66_1$, mechanical energy harvester system $66_3$, or combinations thereof. In that configuration, different embodiments above are combined to recharge the storage battery 300 (and thereby, the primary battery 40). For example, the storage battery 300 may be charged by an external high voltage AC power source 60 (wired-connected on demand) and solar energy harvester $66_2$; the solar energy harvester $66_2$, the mechanical energy harvester system $66_3$, and the external high voltage AC power source 60 (wired-on demand); the solar energy harvester system $66_2$, the radio or magnetic wave energy harvester system $66_1$, and the mechanical wave energy harvester system $66_3$; the solar energy harvester system $66_2$, the radio or magnetic wave energy harvester system $66_1$, and the mechanical energy harvester system $66_3$; etc.

Figure 12A:
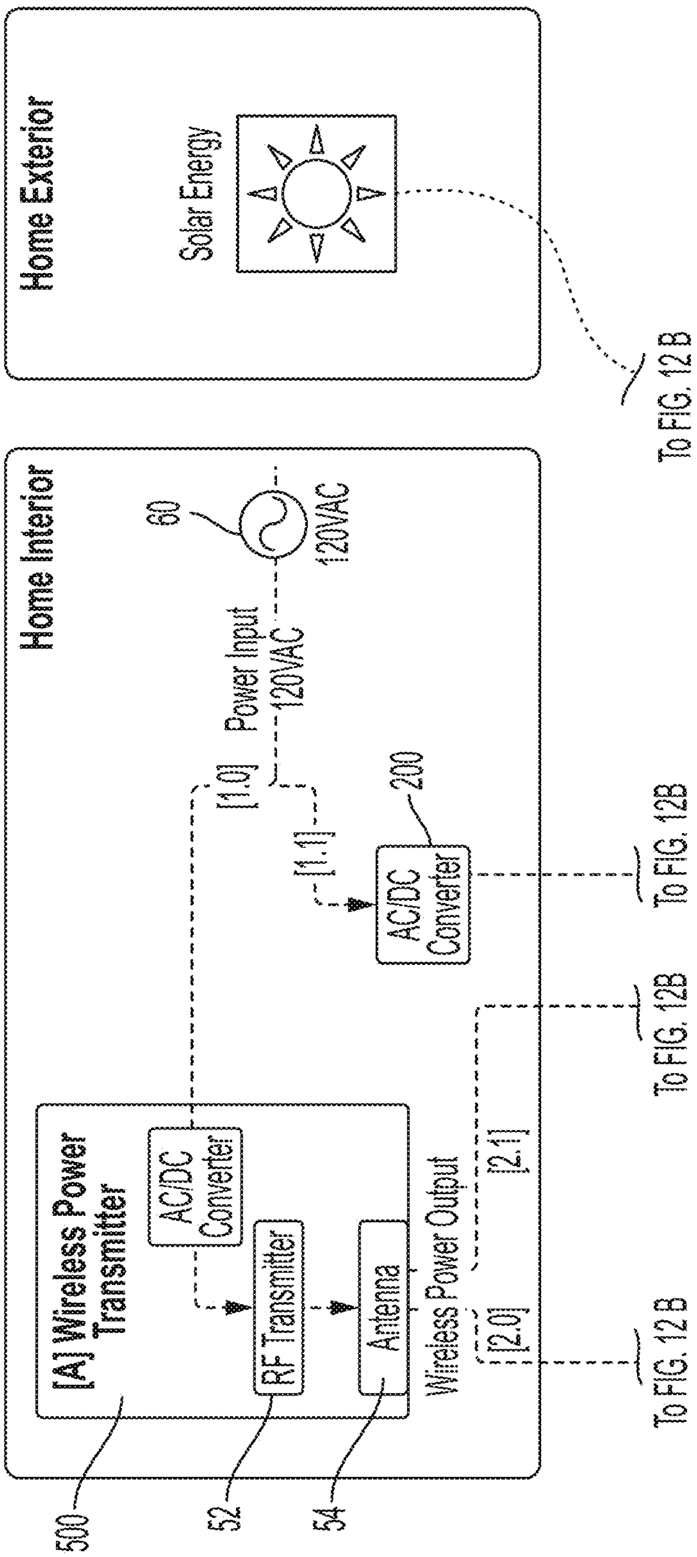
FIGS. 12A-B show a system with multiple external energy harvesters (RF and solar) and a optional high voltage AC power source that can recharge the system's battery.
Figure 12B:
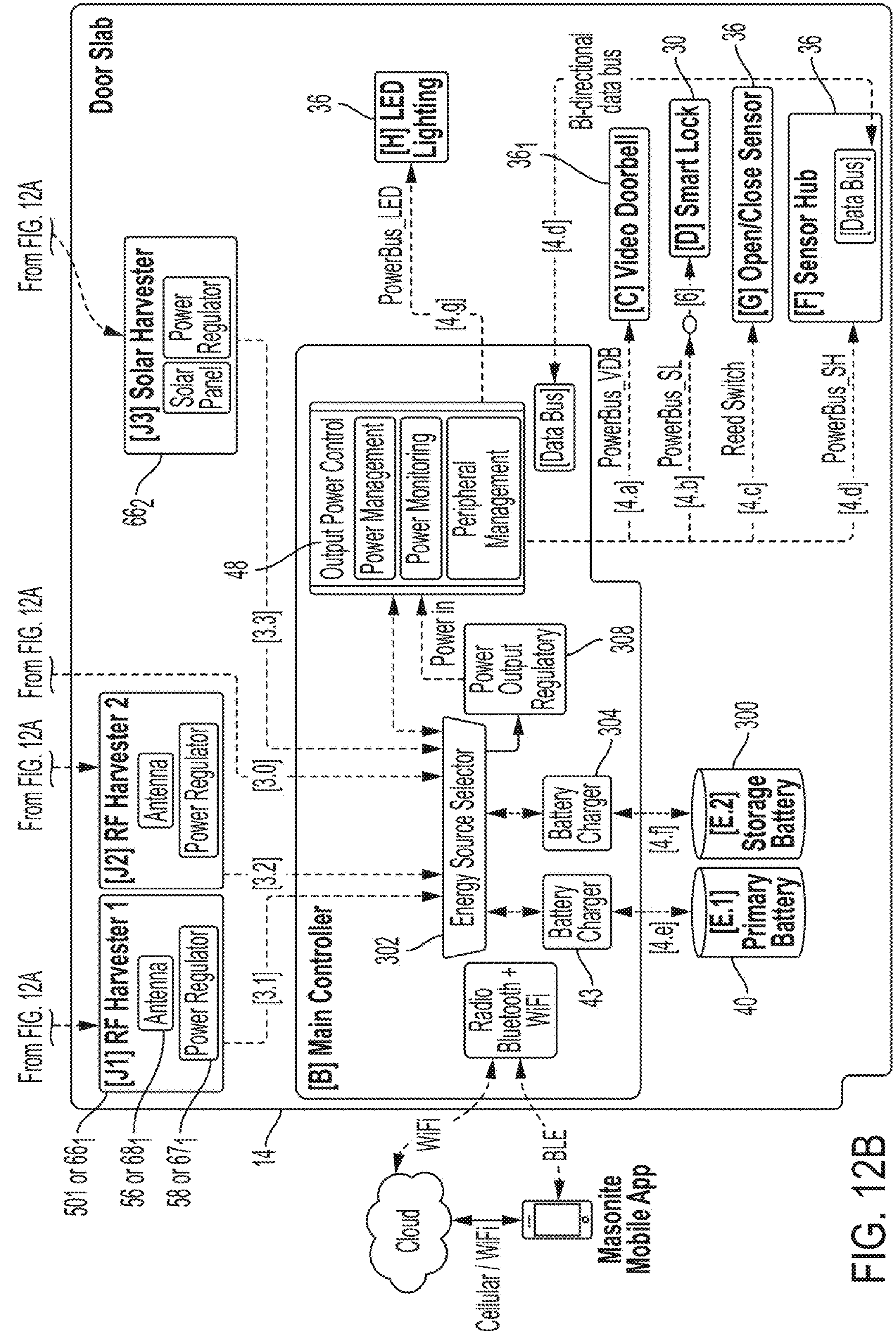

An exemplary system is shown in FIGS. 12A-B, where the primary battery 40 is being charged by the storage battery 300 or a high voltage AC power source 60. As shown in the FIGS. 12A-B, the high voltage AC power source 60 can be used to recharge the primary battery 40 by a temporary wired connection. For wired connection, the AC power is converted to DC by a AC/DC converter 200. The DC power from the AC/DC converter 200 is then wired to the door, preferably by plugging the power wire from the AC/DC converter 200 into the plug-n-play interface 41 of the door 14 (see FIG. 4) The AD/DC converter 200 preferably includes a plug-n-play interface 502 which mates to the plug-n-play interface 41 on the door 14. The wired charging connection, however, is desirable only in limited circumstances where the primary battery 40 needs immediate power (such as when both the primary battery 40 and the storage battery 300 are depleted), because having a wire connected to the door 14 detracts from the aesthetic of the door and is not generally desirable. Once the primary battery 40 is sufficiently charged, the wire may be removed. It should also be understood that the AC/DC converter 200 may also be used to recharge the storage battery 300.

Also in FIGS. 12A-B, for wireless charging, the wireless power transfer system 50, as shown in FIG. 2, is used. That wireless power transfer system 50 includes the power transmitter 52, the transmitting antenna 54 operatively connected to the power transmitter 52, the receiving antenna 56, and the power receiver 58 operatively connected to the coupling device 56. The receiving antenna 56 and the power receiver 58 are located on or inside the door 14, while the power transmitter 52 and the transmitting antenna 54 are remote from the door 14 as disclosed above and in FIG. 3. Essentially, as shown in FIG. 12, the receiving antenna 56 and the power receiver 58 serve as the RF and electromagnetic wave energy harvester $68_1$ and power regulator $67_1$, respectively, of the radio and magnetic wave harvester system $66_1$. The receiving antenna 56 is preferably formed in the door skin 22 and/or 24 as disclosed above and in FIG. 13, FIG. 14, FIG. 15. The power receiver 58 is electrically connected to the energy source selector 302, and eventually the central ECU 48 via plug-n-play interface 41 on the door 14, as disclosed above. The solar energy harvester system $66_2$ preferably plugs into the plug-n-play interface 41 on the door 14, as disclosed above, which connects the solar energy harvester system $66_2$ to the energy source selector 302, and eventually the central ECU 48. The central ECU 48 monitors and controls the energy source selector 302 to distribute power collected from the solar energy harvester system $66_2$ and the power receiver 58 to the storage battery 300 which is charged by the battery charger 304. The storage battery 300 is used to charge the primary battery 40 when the primary battery 40 is deplete of power (power insufficient to run the ECU 48, smart lock 30, other electric devices 36, power regulator(s) 67, energy source selector, and other electricity consuming component of the door 14). Power from the primary battery 40 (or storage battery 300 as explained below) is distributed to the ECU 48, smart lock 30, other electric devices 36, power regulator(s) 67, energy source selector, and other electricity consuming component of the door 14), via the power output regulator 308.

Although FIGS. 12A-B shows the solar energy harvester system $66_2$ and radio and magnetic waves energy harvester $66_1$ being used to charge the storage battery 300, other energy harvester systems 66, such as the mechanical energy harvester system $66_3$ and/or other energy harvester system $66_4$ may similarly be used. Those energy harvester systems $66_1$, $66_3$-$66_4$ may be used in conjunction with or instead of the solar energy harvester system $66_2$. Additionally, although FIGS. 12A-B shows the high voltage AC power source 60 being used to recharge the primary battery 40 by direct wired connection, however the use of the AC power source and the wired charging is not preferred of the wireless options discussed above, but used only in special instances when both the storage 300 and primary 40 do not have enough power to run the system, as disclosed above.

Referring to FIG. 4 which shows the use of the energy harvester systems 66) to charge the storage battery 300 (and thereby the primary battery 40). As shown in FIG. 4, in conjunction with the energy harvester systems 66, the storage battery 300 is can also be charged by a wired connection to the high voltage AC power source 60 via the AC/DC converter. The wired connection is preferably plugged into the plug-n-play interface 41 in the door 14. Although FIG. 4 shows the radio and magnetic wave energy harvester system $66_1$, the solar energy harvester system $66_2$, a mechanical energy harvester system $66_3$, and other energy harvester system $66_4$ being connected to the plug-n-play interface 41 on the door, not all energy harvester systems 66 must be plugged into the door at once. One or more, preferably two or more, may be used to provide a reliable energy source. Additionally, the primary battery 40 may also be charged directly by the wired high voltage AC power source 60, as shown in FIG. 4, FIGS. 12A-B, and FIGS. 16A-C.

As noted above, the storage battery 300 is charged by the energy harvester systems 66 and/or the wired high voltage AC power source 60 via the charger 304. The storage battery 300 is then used to charge the primary battery 40 via charger 43. That system is designed to allow energy to be stored (in the storage battery 300) while the primary battery 40 is simultaneously being drained to power the system (power regulator(s), energy source selector, ECU 48, smart lock 30 and/or the electric devices 36). When the primary battery 40 has sufficient power to operate the system, the storage battery 300 is charged by the energy harvester systems 66 and/or the wired high voltage AC power source 60. When the primary battery 40 is depleted, charging of the storage battery 300 is disabled and the storage battery 300 is used to charge the primary battery 40 and to power the system, as shown in FIG. 4, 12A-B, 16A-C. This allows uninterrupted operation of the system. The electrical circuits responsible for switching battery operation of the primary battery 40 and the storage battery 300 are located in an energy source selector module (ESSM) 302 (see FIGS. 4, 12, and 16). The ECU 48 includes a power monitoring and management logic module (MMLC) 306 which communicates with and controls the ESSM 302 (see FIG. 16A-C).

Overall, the ECU 48 acts as the brains of the system. It monitors the signals received from the ESSM 302 to enable/disable charging of the batteries, to select the appropriate power source for charging the primary battery, to selecting the appropriate power source for operating the system, and/or to enable/disable the energy harvester system(s) 66 when not needed. The ECU 48 also manages the smart lock 30 and electric devices 36 by providing and monitoring the appropriate power/communication needed for normal operation.

Referring to FIGS. 4 and 16, mating of the plug-n-play interfaces 74, 41 allows energy to be collected simultaneously at the different energy harvester systems 66 and then directed to the ESSM 302. The ESSM 302 is located in the door 14 and contains hardware to provide, but not limited to, four (4) main functions: 1) routing power for the system (the electric devices 36, smart lock 30, power regulator(s) 67, energy source selector 302, and any other electrical powered device); 2) routing power for re-charging the primary battery: 3) enabling/disabling charging of the batteries 40, 300 (a battery cannot be discharged and recharged at the same time); and 4) combining the harvested energy from the various energy harvester systems so they can be used to recharge the storage battery 300. Those skilled in the art will also know that ESSM 302 may also use software. The ESSM 302 interfaces with the ECU 48 to send and to receive signals thereto/therefrom. The signals received from the ECU 48 include, but are not limited to, signals to enable/disable charging of the batteries, to change the power source for charging the primary battery 40, to select the appropriate power source for the system power; and to enable/disable energy harvester systems when not needed. Signals sent to the ECU 48 include, but are not limited to, charge status of the primary battery 40 and/or the storage battery 300 (low charge, full charge, etc.), charger status of the primary battery 40 and/or the storage battery 300 (charging, not charging), and the presence of wired connected AC/DC converter 200.

Power is sent from the primary battery 40 or the storage battery 300 to power the ECU 48 which manages delivering power to the door lock 30 and/or the electric devices 36. During the power transfer, as shown in FIGS. 4 and 16A-C, power passes through a power output regulator 308 between the ESSM 302 and the ECU 48. The power output regulator 308 regulates the power so it can be efficiently used by the system. For example, the power output regulator 308 regulates the voltage to meet the requirements of the different electric devices 36 and/or power door lock 30. The power output regulator 308 also monitors and limits the current draw to prevent too much current which may damage the power sources.

Figure 17A:
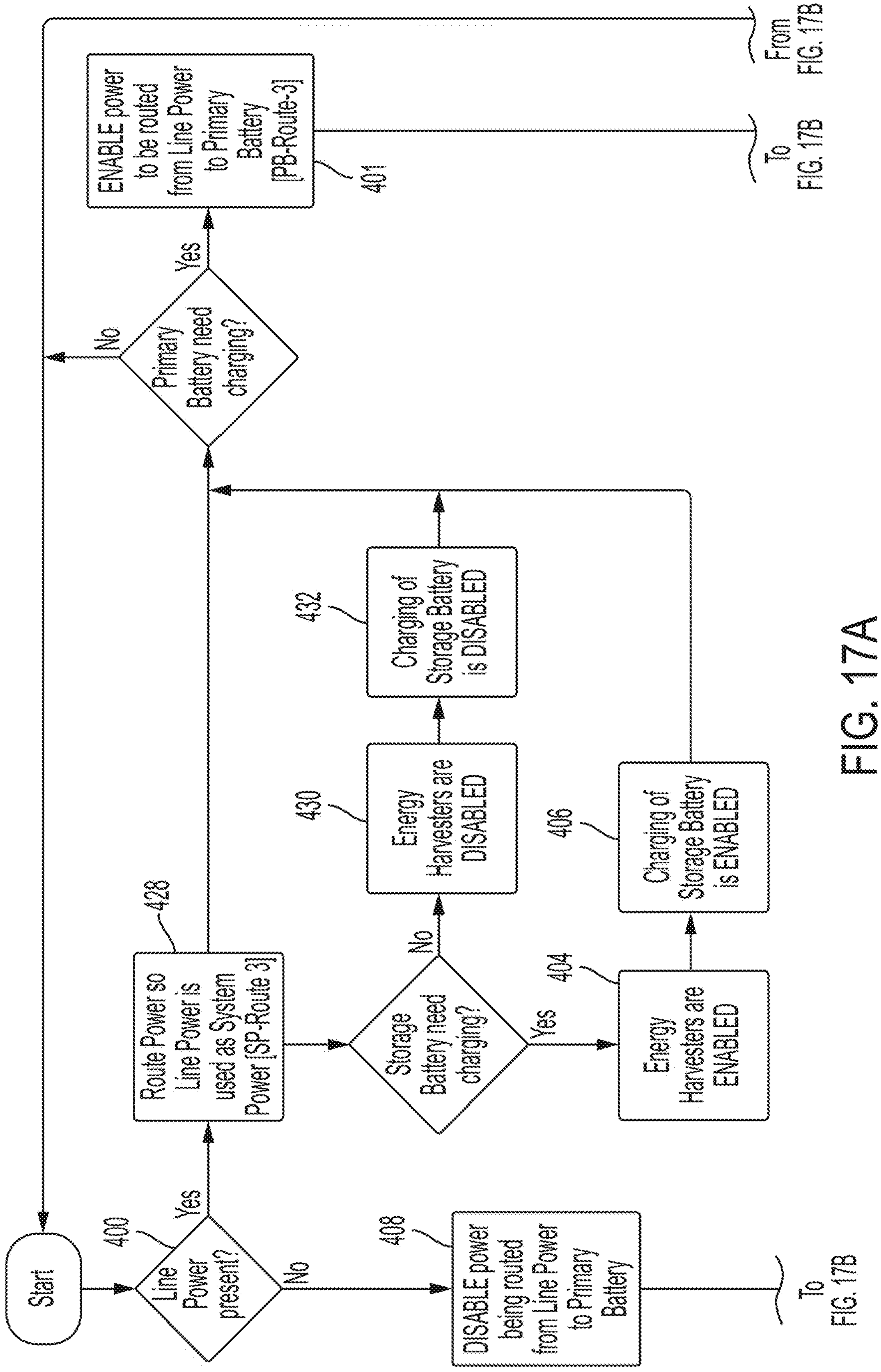
FIGS. 17A-B show a flow chart showing the power management logic.
Figure 17B:
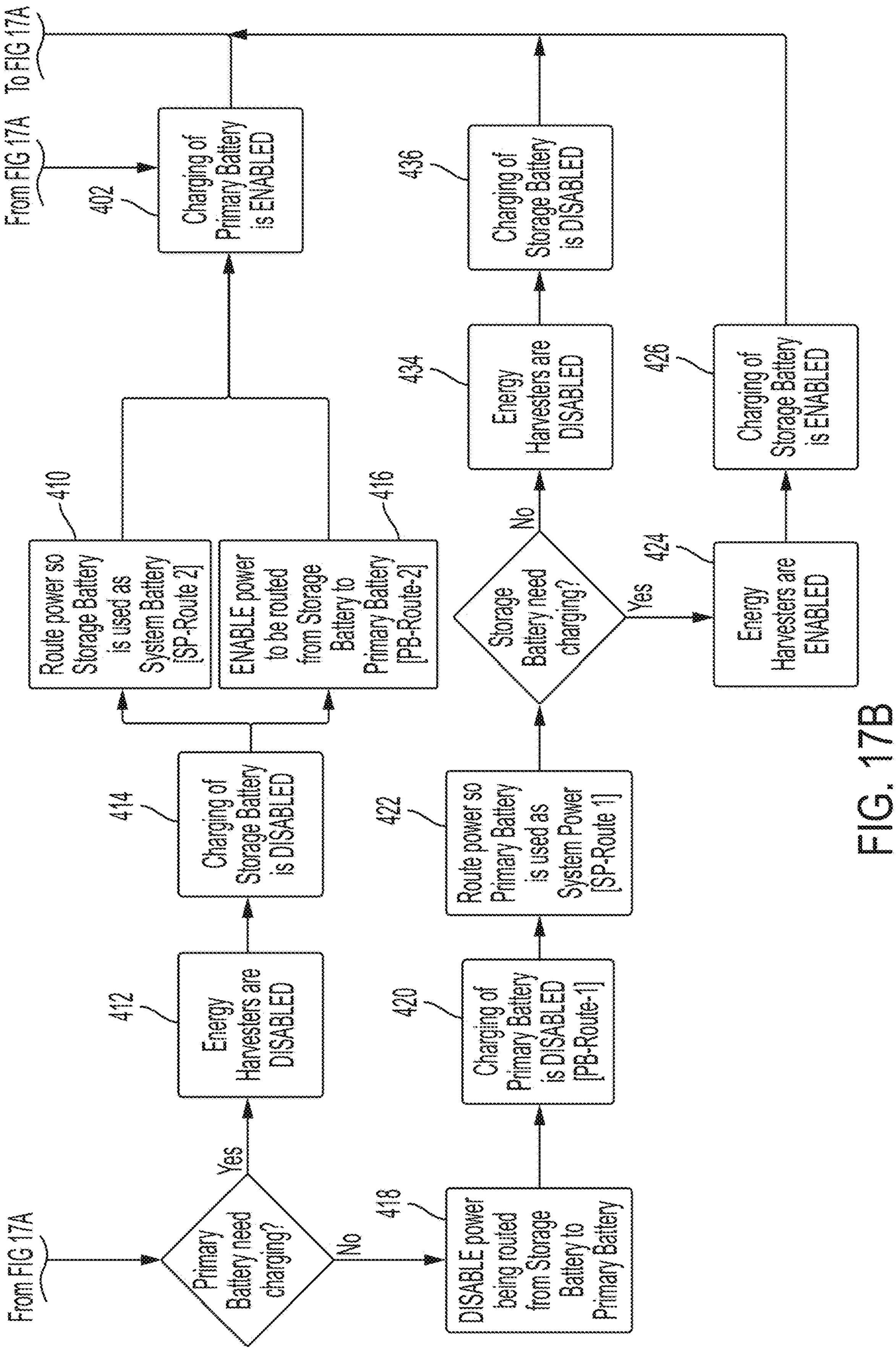

FIGS. 17A-B is a schematic showing the logic used by the MMLC 306 to manage power usage in the system. That logic allows the ECU to direct power collected from the different external energy sources, charge the batteries (300 and 40), and power the system's electrical devices. The MMLC 306 first determines whether the line power (wired connection to power source 60) is available (box 400). If line power is connected (direct wired connection to a power source 60), it is used to provide power to the rest of the system (box 428), and, if needed, to charge the primary battery 40 (box 402) by enabling power to be routed to the primary battery charger 43 (box 401). At the same time, if needed, the external energy harvester systems 66 are enabled (box 404) only for charging the storage battery 300 (box 406). If the storage battery 300 does not need to be charged, the energy harvesters are disabled (box 430) thus stopping the storage battery from being charged (box 432).

If line power is not available, line power to the primary battery charger 43 is disabled (box 408). If needed, the primary battery 40 is charged (box 402) by routing power from the storage battery 300 to the primary battery 40 (box 410). At the same time, however, the external energy harvester systems 66 are disabled (box 412) which also disable charging of the storage battery 300 (box 414) to prevent the storage battery 300 from being charged and discharged at the same time. While the primary battery 40 is being charged by the energy stored in the storage battery 300, the storage battery 300 is also used to power the rest of the system (box 416). If the primary battery 40 does not need to be charged, power from the storage battery 300 to the primary battery 40 is disabled (box 418) which disables charging of the primary battery 40 (box 420). At the same time, power from the primary battery 40 is used to power the system (box 422). Once the primary battery 40 is used to power the system (box 422), the external energy harvester systems are enabled (box 424) to charge the storage battery 300 (box 426). If the storage battery 300 does not need to be charged, the energy harvesters are disabled (box 434) thus stopping the storage battery from being charged (box 436).

The foregoing description of the exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A door assembly, comprising: a door frame mounted with an opening;
- a door pivotally mounted on the door frame;
- a plurality of DC electrical devices mounted to the door on at least a first side thereof;
- a rechargeable primary battery mounted inside the door and electrically connected to the electrical devices;
- a first battery charger system that charges the primary battery;
- a rechargeable storage battery mounted inside the door and electrically connected to the electrical devices and the first battery charger system;
- a second battery charger system that charges the storage battery;
- an energy harvester system comprising one or more of: an RF and electromagnetic wave energy harvester, a solar energy harvester, and a mechanical energy harvester; and
- an energy source selector module disposed within the door and electrically connected to the energy harvester system, the first battery charger system, and the second battery charger system,
- wherein the energy source selector module is configured to route energy from the energy harvester system to one or both of the first battery charger system and the second battery charger system based on battery condition,
- wherein the energy harvester system is configured to charge the storage battery via the second battery charger system and wherein the first battery charger system and the second battery charger system each comprises a charging circuit configured to regulate charging current and report battery status to a controller.

2. The door assembly of claim 1, wherein the first battery charger system is configured to receive power from the storage battery.

3. The door assembly of claim 1, wherein the solar energy harvester is mounted to the door such that the solar panel is exposed to ambient solar radiation.

4. The door assembly of claim 3, wherein the door comprises a door panel slidable over the solar energy harvester to cover the solar energy harvester.

5. The door assembly of claim 4, wherein the door panel is motor operated.

6. The door assembly of claim 3, wherein the solar energy harvester is mounted at the bottom of the door.

7. The door assembly of claim 3, wherein the solar energy harvester is disposed in a door lite.

8. The door assembly of claim 7, wherein door slats within the door lite comprises the solar energy harvester.

9. The door assembly of claim 1, wherein the solar energy harvester is disposed remote from the door on an exterior side thereof.

10. The door assembly of claim 1, wherein the mechanical energy harvester is mounted within the door.

11. The door assembly of claim 10, wherein the mechanical energy harvester comprises a flexible cantilever beam secured to a fixed rigid support, a front piezoelectric plate secured to a front surface of the flexible cantilever beam, a rear piezoelectric plate secured to a rear surface of the flexible cantilever beam, and a proof mass secured to a free distal end of the cantilever beam.

12. The door assembly of claim 10, wherein the mechanical energy harvester comprises an elongated casing, an electromagnetic coil mounted at one distal end of the casing, and a magnet mounted within the casing and rectilinearly moveable to and from the electromagnetic coil.

13. The door assembly of claim 12, wherein the magnet is elastically biased toward the electromagnetic coil by a coil spring.

14. The door assembly of claim 1, wherein the energy harvester system further comprises a power regulator and an energy capture circuit for each of the RF and electromagnetic wave energy harvester, the solar energy harvester, and the mechanical energy harvester.

15. The door assembly of claim 1, wherein at least one of the primary battery and the storage battery is located in a compartment in the door.

16. The door assembly of claim 1, further comprising a wired connection from the door to a power source, the wired connection is configured to charge the primary battery via the first battery charger system and the storage battery via the second battery charger system.

17. A door, comprising:
a frame;
door skins mounted to opposing sides of the frame;
a plurality of DC electrical devices mounted to the door skins or the frame;
a rechargeable primary battery mounted between the door skins and connected to the electrical devices;
a first battery charger system that charges the primary battery;
a rechargeable storage battery mounted between the door skins and electrically connected to the electrical devices and the first battery charger system;
a second battery charger system that charges the storage battery;
an energy harvester system comprising one or more of: an RF and electromagnetic wave energy harvester, a solar energy harvester, and a mechanical energy harvester; and
an energy source selector module disposed within the door skins and electrically connected to the energy harvester system, the first battery charger system, and the second battery charger system,
wherein the energy source selector module is configured to route energy from the energy harvester system to one or both of the first battery charger system and the second battery charger system based on battery condition,
wherein the energy harvester system is configured to charge the storage battery via the second battery charger system and wherein the first battery charger system and the second battery charger system each comprises a charging circuit configured to regulate charging current and report battery status to a controller.

18. The door of claim 17, wherein the first battery charger system is configured to receive power from the storage battery.

19. The door of claim 17, wherein the solar energy harvester is mounted to the door such that the solar panel is exposed to ambient solar radiation.

20. The door of claim 19, wherein the door comprises a door panel slidable over the solar energy harvester to cover the solar energy harvester.

21. The door of claim 20, wherein the door panel is motor operated.

22. The door of claim 19, wherein the solar energy harvester is mounted at the bottom of the door.

23. The door of claim 19, wherein the solar energy harvester is disposed in a door lite.

24. The door of claim 23, wherein door slats within the door lite comprises the solar energy harvester.

25. The door of claim 17, wherein the solar energy harvester is disposed remote from the door on an exterior side thereof.

26. The door of claim 17, wherein the mechanical energy harvester is mounted within the door.

27. The door of claim 26, wherein the mechanical energy harvester comprises a flexible cantilever beam secured to a fixed rigid support, a front piezoelectric
plate secured to a front surface of the flexible cantilever beam, a rear piezoelectric plate secured to a rear surface of the flexible cantilever beam, and a proof mass secured to a free distal end of the cantilever beam.

28. The door of claim 26, wherein the mechanical energy harvester comprises an elongated casing, an electromagnetic coil mounted at one distal end of the casing, and a magnet mounted within the casing and rectilinearly moveable to and from the electromagnetic coil.

29. The door of claim 28, wherein the magnet is elastically biased toward the electromagnetic coil by a coil spring.

30. The door of claim 17, wherein the energy harvester system further comprises a power regulator and an energy capture circuit for each of the RF and electromagnetic wave energy harvester, the solar energy harvester, and the mechanical energy harvester.

31. The door of claim 17, wherein at least one of the primary battery and the storage battery is located in a compartment in the door.

32. The door of claim 17, further comprising a wired connection from the door to a power source, the wired connection is configured to charge the primary battery via the first battery charger system and the storage battery via the second battery charger system.

33. A method for making the door of claim 17, the method comprising: providing the frame;
mounting the door skins to opposing sides of the frame;
mounting the plurality of DC electrical devices to the door on at least a first side thereof;
mounting the rechargeable primary battery inside the door and electrically connecting it to the electrical devices;
providing the first battery charger system configured to charge the primary battery;
mounting the rechargeable storage battery inside the door and electrically connecting it to the electrical devices and the first battery charger system;
providing the second battery charger system configured to charge the storage battery; and
providing the energy harvester system comprising one or more of the RF and electromagnetic wave energy harvester, the solar energy harvester, and the mechanical energy harvester, wherein the energy harvester system is configured to charge the storage battery via the second battery charger system.

34. The method of claim 33, further comprising a step of providing a wired connection from the door to a power source, the wired connection is configured to charge the primary battery via the first battery charger system and the storage battery via the second battery charger system.

* * * * *